US011519880B2

(12) United States Patent
Lazzari

(10) Patent No.: US 11,519,880 B2
(45) Date of Patent: Dec. 6, 2022

(54) NON-DESTRUCTIVE TESTING FOR TUBULAR PRODUCT HAVING A COMPLEX SHAPE

(71) Applicant: VALLOUREC TUBES FRANCE, Boulogne-Billancourt (FR)

(72) Inventor: Olivier Lazzari, Valenciennes (FR)

(73) Assignee: VALLOUREC TUBES FRANCE, Meudon (FR)

( * ) Notice: Subject to any disclaimer, the term of this patent is extended or adjusted under 35 U.S.C. 154(b) by 31 days.

(21) Appl. No.: 16/625,298

(22) PCT Filed: Jun. 19, 2018

(86) PCT No.: PCT/FR2018/051459
§ 371 (c)(1),
(2) Date: Dec. 20, 2019

(87) PCT Pub. No.: WO2018/234678
PCT Pub. Date: Dec. 27, 2018

(65) Prior Publication Data
US 2020/0182832 A1 Jun. 11, 2020

(30) Foreign Application Priority Data
Jun. 23, 2017 (FR) ...................... 1755793

(51) Int. Cl.
*G01N 29/04* (2006.01)
*G01N 29/22* (2006.01)
(Continued)

(52) U.S. Cl.
CPC ......... *G01N 29/043* (2013.01); *G01N 29/221* (2013.01); *G01N 29/275* (2013.01);
(Continued)

(58) Field of Classification Search
CPC .. G01N 29/043; G01N 29/221; G01N 29/275; G01N 29/38; G01N 29/4463;
(Continued)

(56) References Cited

U.S. PATENT DOCUMENTS 4,016,750 A * 4/1977 Green ............... A61B 8/08
73/629
2006/0225508 A1* 10/2006 Sfeir ............... G01N 29/07
73/602
(Continued)

FOREIGN PATENT DOCUMENTS

DE  10 2012 112 119 A1  6/2014
FR   2 796 153 A1   1/2001
(Continued)

OTHER PUBLICATIONS

International Search Report dated Aug. 21, 2018 in PCT/FR2018/051459 filed on Jun. 19, 2018, 3 pages.

*Primary Examiner* — Randy W Gibson
*Assistant Examiner* — John M Royston
(74) *Attorney, Agent, or Firm* — Oblon, McClelland, Maier & Neustadt, L.L.P.

(57) ABSTRACT

An automated device for non-destructive testing for the detection of defects of a complex tubular product includes at least one ultrasound transducer arranged to emit an ultrasound beam having an emission orientation. The automated device further includes control and processing electronics configured to define at least one ultrasound burst parameter as a function of the longitudinal and/or circumferential position of the ultrasound emission means, so as to detect defects in the tube wall. The at least one parameter being chosen from the burst emission orientation, the gain or the position of the temporal filter.

21 Claims, 10 Drawing Sheets

(51) Int. Cl.
   *G01N 29/275* (2006.01)
   *G01N 29/38* (2006.01)
   *G01N 29/44* (2006.01)

(52) U.S. Cl.
   CPC ......... *G01N 29/38* (2013.01); *G01N 29/4463* (2013.01); *G01N 2291/0289* (2013.01); *G01N 2291/044* (2013.01); *G01N 2291/056* (2013.01); *G01N 2291/2634* (2013.01); *G01N 2291/2638* (2013.01)

(58) Field of Classification Search
   CPC ..... G01N 2291/0289; G01N 2291/044; G01N 2291/056; G01N 2291/2634; G01N 2290/2638
   See application file for complete search history.

(56) References Cited

U.S. PATENT DOCUMENTS

| | | | |
|---|---|---|---|
| 2010/0170344 A1 | 7/2010 | Lesage et al. | |
| 2014/0095085 A1* | 4/2014 | Fetzer | G01N 29/043 702/56 |
| 2015/0316513 A1* | 11/2015 | Grimard | G01N 29/4463 702/103 |
| 2016/0195499 A1 | 7/2016 | Michel et al. | |
| 2016/0349213 A1* | 12/2016 | Kollgaard | G01N 29/0645 |

FOREIGN PATENT DOCUMENTS

| | | |
|---|---|---|
| FR | 2 917 832 A1 | 12/2008 |
| FR | 3 000 212 A1 | 6/2014 |
| GB | 1181608 | 2/1970 |

\* cited by examiner

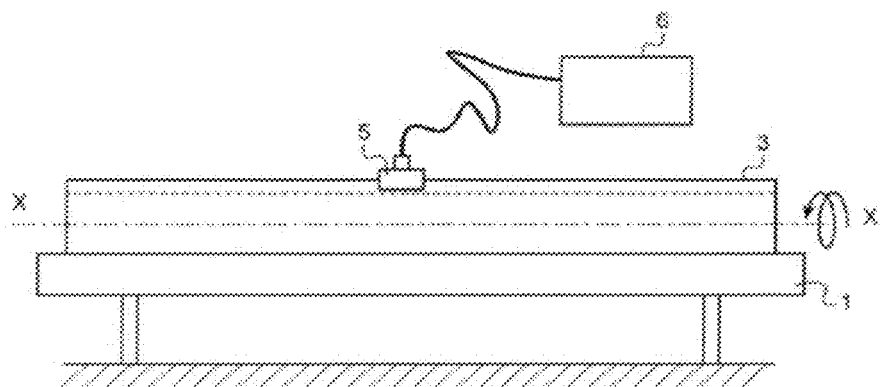
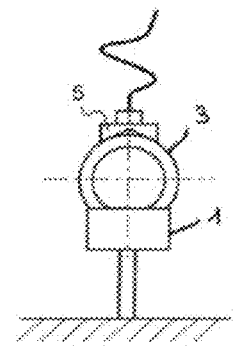
Fig.1　　　　　　　　　　Fig.2
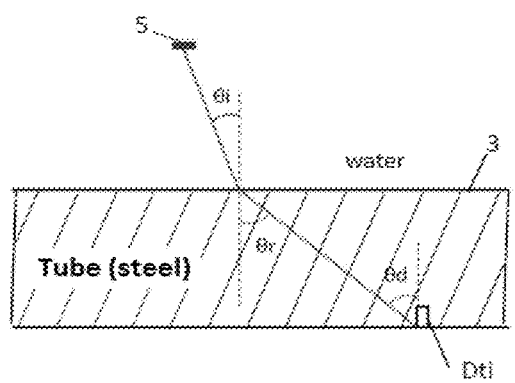
Fig. 3
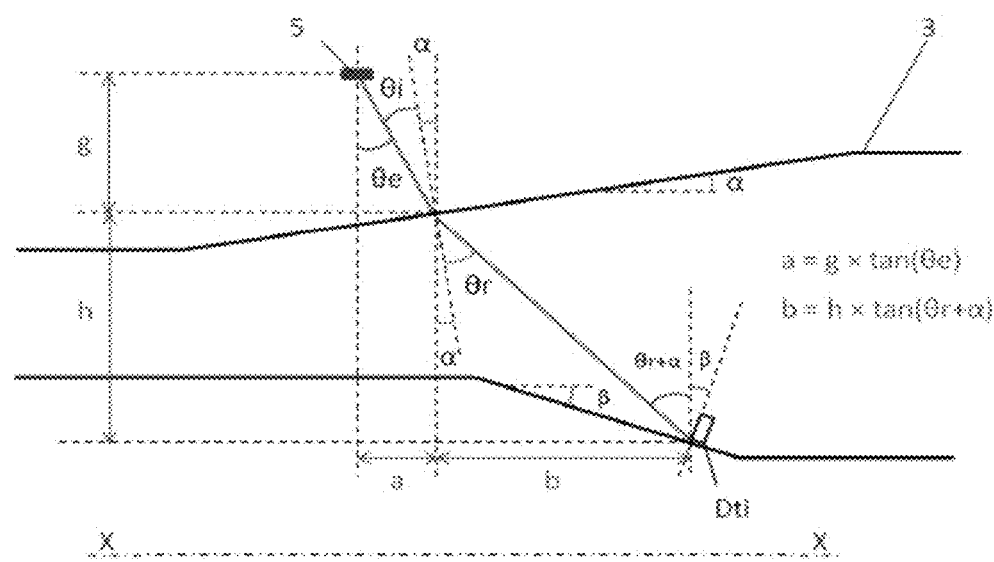
Fig. 4

NON-DESTRUCTIVE TESTING FOR TUBULAR PRODUCT HAVING A COMPLEX SHAPE

TITLE

Background

The invention relates to the field of non-destructive tests of metallurgical products, in particular tubular products and more particularly tubular products having variations in inside and/or outside diameters.

Great-length tubes are widely used in different fields of application. There may be mentioned for example electricity generation, in which tubes known as "boilers" are used, the petroleum and gas industries, in which tubes are used for drilling, extraction and transportation (line pipes), or also mechanical construction, whether in civil engineering or in the automotive and aeronautical sectors.

For better understanding of the invention, it is described in the context of products that are generally tubular, in particular tubes, as examples of metallurgical products. Nevertheless, the invention is intended to apply more widely to profiles having geometrical variations of the walls thereof along the main axis thereof.

According to one aspect, the invention is also intended to apply to tubular profiles having variations in thickness on the circumference thereof, for example tubes having a hollow structure with a square or rectangular cross section, called SHS profiles, or also hexagonal-section tube profiles, or also tubes having circular external and hexagonal internal cross sections, or also other types of cross section resulting from intentional variations in the local thickness of the tube.

Like most metallurgical products, the tubes may present defects linked to the manufacture thereof, such as inclusions of material in the steel, cracks on an internal surface or an external surface, or also porosities. Generally, any heterogeneity in the steel matrix is seen as an imperfection that may be detrimental to the mechanical strength of the tube in service.

For this reason, metal tubes are inspected after production thereof, not only to detect any defects therein but also, if applicable, to determine useful information for assessment of the risk level of these defects, in particular the size, depth, position, type thereof or also the orientation thereof, and the compliance of these tubes with international standards.

In particular, testing techniques involving ultrasound waves are used. Ultrasound waves are made to propagate in the tube inspected, and from among the resulting echoes, those that cannot be attributed to the geometry of the tube are investigated. The inclusions or instances of absence of material constitute variations within the wave propagation medium, and accordingly generate echoes when struck by ultrasonic waves. These variations can be seen as imperfections.

The intensity of the echo produced by an imperfection depends on the angle at which the wave strikes the imperfection. For a direction of propagation of the ultrasound wave in the tube, imperfections that are correspondingly oriented are mainly detected, i.e. perpendicular to the direction of propagation, with nevertheless a certain tolerance, of the order of a few degrees; the amplitude of this tolerance generally being situated between 2 degrees and approximately ten degrees according to the chosen devices.

An imperfection that returns an echo having an amplitude greater than a threshold value is classified as a defect. Generally, an orientation value is associated with this defect, which can be deduced from the direction of inspection, which is the direction imparted to the ultrasound wave by the ultrasound sensor emitting the wave.

This threshold value is predefined by sampling. Conventionally, positioning notches (depth and orientation) are used as reference defects, or standard defects, having known dimensions, most frequently standardized, arranged in a sample tube.

The different types of defects that can most frequently be investigated during testing are the following:

Surface defects:
  Longitudinal internal or external defects. These defects generate, in response to an ultrasound burst having a substantially transverse direction (i.e. a burst situated substantially in a plane perpendicular to the axis of the tube, or in other words in cross section of the tube) an echo having an amplitude greater than a predefined threshold.
  Internal or external transverse defects, also called crosswise defects. These defects generate, in response to an ultrasound burst having a generally longitudinal direction, i.e. a burst situated substantially within a plane containing the axis of the tube, an echo having an amplitude exceeding another predefined threshold.
  Oblique defects. These defects generate, in response to an ultrasound burst in a generally diverging direction with respect to the plane containing the sensor and the axis of the tube, an echo having an amplitude exceeding another predefined threshold. An oblique defect generates, in response to a burst having an intermediate orientation between the longitudinal orientation and the transverse, an echo having an amplitude exceeding another predefined threshold.
Defects, within the walls, generally called "delaminations". These defects generate, in response to an ultrasound burst in a generally radial direction, an echo having an amplitude exceeding a predefined threshold.

In practice, the imperfections are not purely longitudinal or transverse, but return a more or less significant echo in one or other of these directions. The orientation of an imperfection may be taken to be the orientation of its greatest area of reflection.

The duration of the test depends mainly on the number of bursts performed, the time necessary for the outward and return transit of the ultrasound waves in the tube, the transit time within any interface coupling between the sensor and the steel and, to some extent, the processing time for the received return signals.

In order to reconcile the imperatives associated with the production speeds and safety, it has become usual to limit the number of ultrasound bursts, and in each tube, only the defects having certain specific orientations are investigated.

Limiting the number of bursts also makes it possible to limit the electronic data processing, and thus to limit the costs of the hardware required for the data processing.

There is a variety of ultrasound sensors in existence, generally differentiated by the complexity thereof.

The first type of transducer is the single-element transducer (or single crystal transducer). This type of sensor has an ultrasound wave emission direction that is fixed by construction. For the purposes of implementation of the invention, this sensor can be motorized so as to form a directional sensor capable of emitting an ultrasound wave with an emission orientation $\theta e$ of choice, i.e. making it possible to change the emission orientation $\theta e$.

A second type of transducer is the ultrasound transducer known as a phased array transducer, or sequentially-controlled matrix array, also known as a multi-element linear transducer. This type of transducer comprises a plurality of electroacoustic transducer elements, in the form of piezoelectric elements, distributed over an active face of the transducer, in one main direction. For example, these piezoelectric elements can be placed so as to be aligned with one another and form what is sometimes known as a "rod-type transducer". Transducers distributed in this way are known as "one-dimensional transducers". The transducer elements are activated simultaneously or with time lags, sequentially, according to a temporal law, so as to combine the ultrasound waves thus produced in order to form a deflected, optionally focused, wave beam (focal point before the sensor), which makes it possible to inspect a tube with respect to the existence of defects oriented in a corresponding direction.

A testing device using ultrasound waves is also known, comprising a transducer of the one-dimensional phased array type, the elementary transducers of which are distributed around the tube to be inspected. Such a device makes it possible to detect longitudinal defects and delaminations, but only in a reduced segment of the tube. The one-dimensional phased array sensors are the most habitually used as they are more economical to implement and allow faster inspection.

A device for testing metallurgical products is also known from WO2014/096700 comprising an ultrasound transducer having a plurality of elementary transducers (29) that can be operated independently from one another and distributed in a two-dimensional pattern. This type of transducer makes it possible to detect defects having any inclination, using a single sensor, by making it possible in particular to orient a burst without any orientation restriction with respect to a main direction of the sensor.

EMAT sensors are also known, capable of generating ultrasonic waves by electromagnetic means. These sensors generally make it possible to avoid recourse to a coupling means between the sensor and the element to be inspected.

A non-destructive testing installation for metallurgical products is also known from WO 2003/50527 in which a one-dimensional phased array type sensor is used. Each transducer element is activated once, then a processing circuit analyzes the overall response of the tube to this single emission, known in the art as a "burst". Based on a burst performed in the transverse direction of the tube, it is possible to determine the presence not only of defects positioned perpendicularly to this direction but also of defects having an inclination with respect to this perpendicular direction comprised between plus and minus 100.

In the remainder of the present text, an ultrasound transducer may equally well be denoted by the terms "sensor", or "probe" or "transducer", well known to a person skilled in the art.

In practice, on a test bench for a tubular product, three transducers are often used: two transducers dedicated to the detection of defects oriented longitudinally, which make it possible to carry out testing in both directions of travel, or having an inclination with respect to this longitudinal direction comprised between plus or minus 20°, and a third sensor for detecting the defects oriented transversally with respect to the tubular product. A fourth sensor is commonly used to check for the presence of delaminations and for measuring the wall thickness of the tubular product. It is possible to have a fifth sensor dedicated to detecting crosswise defects in addition to the aforementioned third sensor in order to carry out the detection in both directions of longitudinal travel of a tubular product.

An ultrasound testing device is also known from FR 3000212 that is capable of inspecting a metallurgical product, detecting therein defects having any orientation. The device in question uses a single sensor, activated a limited number of times, which makes it possible to maintain a good inspection rate.

According to certain known implementations, the sensors are fixed and a helical movement is imparted to the tube.

According to other known implementations, the ultrasound sensors or probes are rotatably driven at a speed of several thousand revolutions per minute about a tube advancing at a linear speed that can reach up to approximately 1 metre per second.

In other known implementations, for example in FR 2796153, a sensor is used constituted by a multiplicity of ultrasound transducer elements surrounding the tube. The electronics allow the origin of the ultrasound beam to be made to rotate about the tube by switching the groups of activated elements and consequently replacing the above-described mechanical rotation of the sensors with an electronic scanning.

These three types of installations, all well known to a person skilled in the art are known respectively as "rotating head" installations, "rotating tube" installations and installations with a multiplicity of surrounding sensor elements. In the case where sensors operating by electronic scanning are used, the relative rotation of tube/sensors is virtual. As used herein, the expression "relative rotation/translation movement between the tube and the arrangement of transducers" covers the case where the relative rotation is virtual.

All these techniques are today used on tubular products having a cross section known as constant. By "tubular product having a constant cross section" is meant the tubular products the thickness of which is constant, or at least the thickness of which has a constant nominal value and allowing a small dimensional variation inherent in the production processes of these tubes, thus unintentional variations; variations developing within the tolerance values defined by the standards. For example, the dimensional tolerances of the API tubes are of the order of approximately −12.5% to +12.5% of the nominal thickness on the more usual nominal diameters and thicknesses.

However, the techniques for the production of tubular products have recently developed and now make it possible to obtain steel tubes, optionally great-length and great-diameter, having complex shapes, i.e. having intentional variations in thickness and/or intentional variations in the inside diameters and/or outside diameters thereof, resulting in particular in variations greater than the tolerances such as those aforementioned of −12.5% to +10% nominal thickness according to the API standard.

Now, the ultrasound devices testing for the presence of defects in tubular products are not suitable for detecting defects in tubular products having these complex shapes. In particular, the automated ultrasound testing devices for testing tubular products after production thereof at an industrial rate are particularly unsuitable for the inspection of tubular products having complex shapes.

Thus there is a need for better detection of any defects within these tubular products having complex shapes.

BRIEF SUMMARY

The applicant has developed non-destructive testing techniques for steel tubular products, optionally great-length, i.e.

generally up to 20 metres, and great-diameter, i.e. diameters up to 30 inches, i.e. up to approximately 77 cm; having complex shapes, i.e. having variations in the outside and/or inside diameters. For example dimensional variations may be produced by thickening of the tube. These length and diameter values are not limitative of the fields of application of the present invention.

These tubes may present different segment typologies:
a segment having a constant thickness and constant outside and inside diameters,
a segment having a constant inside diameter and an outside diameter varying longitudinally, resulting in an increase or a reduction in the thickness of the tube wall,
a segment having a constant outside diameter and an inside diameter varying longitudinally, resulting in an increase or a reduction in the thickness of the tube wall,
a segment having outside and inside diameters each of which varies, with or without longitudinal variation in the thickness of the tube.

The current automated test benches are suitable for the detection of defects in tubes the outside and inside diameters of which are invariable, i.e. tubes having only one segment of constant thickness and constant outside and inside diameters, but the applicant noted that these known test benches are not suitable for full testing of tubular products comprising segments of different typologies, the outside and/or inside diameters of which vary along the axis thereof. In fact, only a main segment having an invariable outside and inside diameter can be tested with an automated test bench of the state of the art.

In fact, the applicant noted that the detection of a defect via the principle of emission and reception of an ultrasound beam is based on a representative measurement of the path of an ultrasound beam, in particular of the portion of the incident ultrasound beam that reaches (returns to) the sensor after having been reflected by a defect. This ultrasound burst path has significant characteristics: the distance of the path and the orientation of the trajectory, the amplitude of the beam. These characteristics are fixed for each type of defect and each model of tubular product having a cross section known as constant. By "model of tube" is meant generally a set of data including the nominal outside diameter, the nominal inside diameter or the nominal thickness, the steel used, etc.

The applicant noted that when a tubular product has a cross section that is not constant, i.e. with segments having different typologies such as those disclosed above, detection via the known devices is ineffective: the echo of the ultrasound burst measured on the transducer may have an amplitude that is too low to be detected, or is not detected at all.

The applicant noted that the variation in the cross section of a tubular product introduces uncertainties and deviations in the path of an ultrasound beam. It will become apparent that the present invention will compensate for the effect of the variation in the cross section of a tubular product in order to allow optimized industrial inspection improving the detection of defects in a tubular product having a cross section that is not constant.

The present invention thus makes it possible to improve the detectability of a defect despite a variation in the dimension and/or shape of the walls of a tubular product. It is therefore denoted by the term "complex tubular product".

According to an aspect of the invention, the device and the method according to the invention provide a solution by adapting the parameters of the emission instructions of an ultrasound wave from a transducer as a function of the location of the transducer, in particular the longitudinal position of the sensor, by varying an emission orientation of the transducer, or also by varying an emission gain of the transducer.

According to another aspect of the invention, the device and the method according to the invention provide a solution by adapting the reception parameters of an ultrasound signal as a function of the longitudinal location of the transducer, for example the reception gain or also the position of a temporal acquisition window of the echo signal.

According to yet another aspect of the invention, the device and the method according to the invention provide a solution by adapting the emission instruction parameters of an ultrasound wave of a transducer and/or the reception parameters of an ultrasound signal as a function of the circumferential location of the transducer, such as the emission orientation, the emission or reception gain or also the position of a temporal acquisition window of the echo signal.

BRIEF DESCRIPTION OF THE DRAWINGS

FIGS. 1 and 2 show a conventional installation for testing metallurgical products, in respectively a front and side view;

FIG. 3 illustrates a principle of insonification of a tube wall by an ultrasound sensor;

FIG. 4 illustrates a diagrammatic sectional view of a wall of a tube having a complex shape with variable outside and inside diameters and illustrates a burst of an ultrasound transducer onto a transverse defect;

Figure 5:
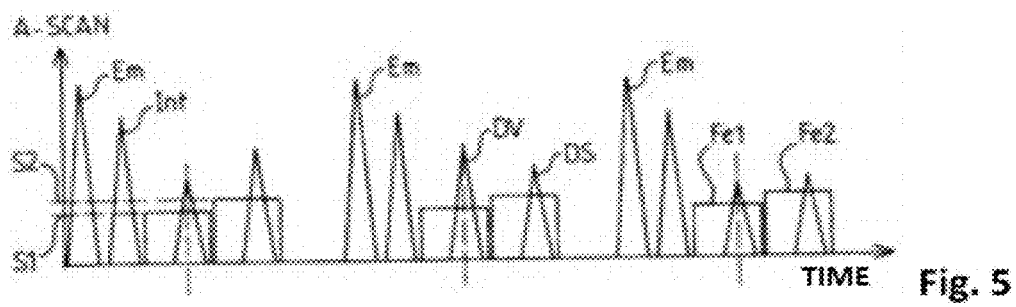
FIG. 5 illustrates an A-scan of an ultrasound burst and the echo thereof over time.

The drawings and the annexes comprise elements with definite character. They may therefore serve not only for the description of the invention but also for the definition thereof, if appropriate.

DETAILED DESCRIPTION

The invention will be described hereinafter mainly from the aspect of a variation in inspection parameters as a function of the longitudinal position of the transducer, corresponding to a preferred embodiment of the invention. However, the invention is also intended to apply to a variation in the inspection parameters as a function of the circumferential position of the transducer, in combination or not with a variation in these parameters as a function of the longitudinal position of the sensor.

The invention relates to an automated device for non-destructive testing for the detection of defects of a complex tubular product (3), comprising:

at least one ultrasound transducer (5) having a position defined by a longitudinal position (L) and a circumferential position (A) along the complex tubular product (3) and arranged to emit an ultrasound beam (Em) having an emission orientation $\theta e_i(L, A)$;

control and processing electronics (6) comprising a circuit for activating the sensor and receiving return signals and at least one amplification stage (21, 31) with a gain $(G_i(L; A))$, a temporal filter module (24) configured to apply a temporal filter $(FT_i(L; A))$ to an echo signal (Dv, Ds), and the control and processing electronics (6) is configured to define at least one ultrasound burst parameter (Vi) as a function of the longitudinal (L) and/or circumferential (A) position of the ultrasound transducer so as to detect defects in the tube wall, said at least one parameter being chosen from the burst emission orientation $(\theta e_i(L; A))$, the gain $(G_i(L; A))$ or the position of the temporal filter $(FT_i(L; A))$.

According to an aspect of the invention, the control and processing electronics (6) can be configured to define at least two ultrasound burst parameters (Vi) as a function of the circumferential position (A) of the at least one ultrasound transducer (5) so as to detect defects in the tube wall, said at least one parameter being chosen from the burst emission orientation $(\theta e_i(L; A))$, the gain $(G_i(L; A))$ or the position of the temporal filter $(FT_i(L; A))$.

Alternatively, the control and processing electronics (6) can be configured to define at least two ultrasound burst parameters (Vi) as a function of the longitudinal position (L) of the at least one ultrasound transducer (5) so as to detect defects in the tube wall, said at least one parameter being chosen from the burst emission orientation $(\theta e_i(L; A))$, the gain $(G_i(L; A))$ or the position of the temporal filter $(FT_i(L; A))$.

According to an aspect, the control and processing electronics (6) is configured to define the burst emission orientation $(\theta e_i(L; A))$, the gain $(G_i(L; A))$ and the position of the temporal filter $(FT_i(L; A))$ of ultrasound bursts (Vi) as a function of the longitudinal position (L) of the at least one ultrasound transducer (5). The control and processing electronics (6) can thus be configured to also define at least one parameter chosen from the burst emission orientation $(\theta e_i(L; A))$, the gain $(G_i(L; A))$ and the position of the temporal filter $(FT_i(L; A))$ of ultrasound bursts (Vi) as a function of the circumferential position (A) of the at least one ultrasound transducer (5).

Additionally, the device can comprise at least one position sensor (7a) for determining the longitudinal position (L) of the at least one ultrasound transducer 5 relatively with respect to the complex tubular product (3). Alternatively, the device can comprise at least one position sensor (7a) for determining the longitudinal position (L) and the circumferential position (A) of the at least one ultrasound transducer 5 relatively with respect to the complex tubular product (3).

The at least one position sensor (7a) can be chosen from an incremental encoder, a rack encoder, a linear encoder, a draw-wire encoder, a laser velocimeter, an encoder wheel or an incremental encoder wheel.

Alternatively, the device can comprise at least one timer (7b) for determining the relative longitudinal (L) and circumferential (A) position of the ultrasound transducer 5.

According to another aspect, the at least one amplification stage (21, 31) can be an emission amplification stage (21) having an emission gain $(Ge_i(L; A))$ and the control and processing electronics (6) is configured to vary said emission gain $(Ge_i(L; A))$ as a function of the longitudinal position (L) of the ultrasound transducer (5).

In a variant, the at least one amplification stage (21, 31) can be a reception amplification stage (31) having a reception gain $(Gr_i(L; A))$ and the control and processing electronics (6) is configured to vary said reception gain $(Gr_i(L; A))$ as a function of the longitudinal position (L) of the ultrasound transducer (5).

In another variant, the device can comprise an emission amplification stage (21) having an emission gain $(Ge_i(L;A))$ and a reception amplification stage (31) having a reception gain $(Gr_i(L; A))$ and in which the control and processing electronics (6) is configured to vary the emission gain $(Gr_i(L; A))$ or the reception gain $(Gr_i(L; A))$ as a function of the longitudinal position (L) of the ultrasound transducer (5).

According to another aspect, the control and processing electronics (6) can comprise a parametric memory module (MEMp) capable of storing data in the form of association between at least one longitudinal position (L) of at least one ultrasound transducer (5) and at least one data set corresponding to emission orientation parameters of the burst $(\theta e_i(L; A))$, gain $(G_i(L; A))$ and/or position of the temporal filter $(FT_i(L; A))$.

Thus, the control and processing electronics (6) can comprise a parametric memory (MEMp) module capable of storing data in the form of association between at least one circumferential position (A) of at least one ultrasound transducer (5) and at least one data set corresponding to emission orientation parameters of the burst $(\theta e_i (L; A))$, gain $(G_i(L; A))$ and/or position of the temporal filter $(FT_i(L; A))$.

Additionally, the control and processing electronics (6) can comprise a parametric memory (MEMp) module capable of storing data in the form of association between longitudinal and circumferential position couplets (L; A) of the ultrasound transducer 5 and at least one data set corresponding to emission orientation parameters of the burst $(\theta e_i (L; A))$, gain $(G_i(L; A))$ and position of the temporal filter $(FT_i(L; A))$.

According to an aspect of the invention, the parametric memory (MEMp) module can comprise at least one data set corresponding to gain parameters ($G_i(L; A)$) in the form of reception gain ($Ge_i(L; A)$) and emission gain parameters ($Gr_i(L; A)$).

According to another aspect of the invention, the control and processing electronics (6) can be configured to emit several ultrasound bursts (Vi) for one position of the ultrasound transducer (5), the ultrasound bursts (Vi) having angles of emission $\theta e_j(L)$ comprised between a minimum orientation angle of position $\theta e_{mini}(L)$ and a maximum orientation angle of position $\theta e_{maxi}(L)$.

Thus, the control and processing electronics (6) can be arranged to carry out from 2 to 8 ultrasound bursts (Vi) for a position of the at least one ultrasound transducer (5).

According to an aspect of the invention, the at least one ultrasound transducer (5) can be a rod-type ultrasound transducer.

According to an aspect of the invention, the at least one ultrasound transducer (5) can be a phased array sensor.

The invention also relates to an automated method for testing tubular products having varying outside or inside diameters comprising the following steps:

a. at least one ultrasound transducer (5) is positioned in a first position (P1),
b. a first ultrasound burst (Vi) is carried out by emitting an ultrasound beam (Em) having a first orientation $\theta e_i$ (P1), and a first emission amplification with a first emission gain $Ge_i(P1)$,
c. an echo returned by the complex tubular product (3) is received and the received echo is converted into a received signal to which a first reception gain $Gr_i(P1)$ is applied,
d. A portion of the signal is isolated in a first temporal window ($FT_i(P1)$),
e. A second ultrasound burst is performed, repeating steps a to d at a second position (P2), with second ultrasound burst parameters, comprising a second orientation $\theta e_i$ (P2), a second emission gain $Ge_i(P2)$, a second reception gain $Gr_i(P2)$, a second temporal window ($FT_i(P2)$), and
at least one of the second ultrasound burst parameters from the second orientation $\theta e_i(P2)$, the second emission gain $Ge_i(P2)$, the second reception gain $Gr_i(P2)$, the second temporal window ($FT_i(P2)$), is different from the first orientation $\theta e_i(P1)$, the first emission gain $Ge_i(P1)$, the first reception gain $Gr_i$ (P1) or the first temporal window ($FT_i(P1)$).

According to an aspect of the method, the first position (P1) comprises a first longitudinal position (L1) and a first circumferential position (A1) and step e) is replaced by step f) in which a second ultrasound burst is performed, repeating steps a) to d) at a second longitudinal position (L2), with second ultrasound burst parameters comprising a second orientation $\theta e_i(L2)$, a second emission gain $Ge_i(L2)$, a second reception gain $Gr_i(L2)$, a second temporal window ($FT_i(L2)$)
and
at least one of the second ultrasound burst parameters from the second orientation $\theta e_i(L2)$, the second emission gain $Ge_i(L2)$, the second reception gain $Gr_i(L2)$, the second temporal window ($FT_i(L2)$) is different from the first orientation $\theta e_i$ (P1), the first emission gain $Ge_i(P1)$, the first reception gain $Gr_i(P1)$ or the first temporal window ($FT_i(P1)$).

It is understood that when the electronics is configured to define at least one parameter of ultrasound bursts Vi as a function of the longitudinal position L of the ultrasound emission means so as to detect defects in the tube wall, said at least one parameter being chosen from the burst emission orientation $\theta e_i$ (L), the gain $G_i(L)$ or the position of the temporal filter $FT_i(L)$; while the electronics is configured to define at least one parameter of ultrasound bursts Vi at at least one first longitudinal position L1 of the ultrasound emission means so as to detect defects in the tube wall, said at least one parameter being chosen from the burst emission orientation $\theta e_i(L)$, the gain $G_i(L)$ or the position of the temporal filter $FT_i(L)$, and in that the electronics is also configured to define at at least one second longitudinal position L2 at least one parameter chosen from the burst emission orientation $\theta e_i$ (L), the gain $G_i(L)$ or the position of the temporal filter $FT_i(L)$ different from the chosen parameter or parameters at said at least one first longitudinal position L1.

Reference is made to FIGS. 1 and 2.

An ultrasound wave testing installation comprises a test bench 1 supporting a complex tubular product 3 with axis X to be tested and an ultrasound transducer 5, positioned close to the peripheral surface of the complex tubular product 3, and linked to a control and processing electronics 6 comprising an electronic circuit to activate the sensor.

A helical movement can be imparted to the complex tubular product 3 so that the testing device inspects the entirety of the complex tubular product 3.

In a variant, a rotational movement can be imparted to the complex tubular product 3 only with respect to the test bench 1, and the transducer 5 slides in the longitudinal direction of the test bench 1, synchronously with respect to the movement of the complex tubular product 3, or sequentially. The transducer 5 can be mounted on a carriage that is mobile with respect to the test bench 1. According to yet another variant, the transducer 5 can rotate about the complex tubular product 3, while the latter is translated with respect to the test bench 1, synchronously or sequentially. Generally, two types of inspection trajectories result therefrom: a first trajectory known as helical trajectory, or a second trajectory known as incremental, by unitary segments. The incremental trajectory by segments allows the sensor to scan a circumference of the tubular product before advancing by one increment in the longitudinal direction in order to perform a fresh circumferential scanning. This type of trajectory can have the advantage of simplifying the electronics, and for example of minimizing the changes of inspection parameters when the latter depend on the longitudinal position of the transducer.

These trajectories make it possible to test the whole of the complex tubular product 3 using a sensor having a reduced span with respect to the circumference of the complex tubular product 3. As a replacement, provision may be made for a greater number of sensors, arranged in a circle around the complex tubular product 3, and ensuring a burst sequence that guarantees coverage when the complex tubular product 3 slides with respect to the transducer 5.

A coupling medium, or "couplant" in the art, can be intercalated between the transducer 5 and the peripheral surface of the complex tubular product 3, for example in the form of gel or water. In a variant, the installation can comprise a tank filled with water, or any other liquid couplant medium, in which the complex tubular product 3 and the transducer 5 are immersed. In another variant, the installation can comprise a device with a water jet, the flow of water then constituting the couplant medium.

The installation is intended to inspect the complex tubular product 3 in order to check therein the existence of defects having different orientations from one another. The direction of inspection corresponds to the orientation, within the complex tubular product 3, of the defects investigated.

In order to make it possible, in the responses from the complex tubular product 3, to distinguish echoes resulting from defects from those resulting from imperfections, the test installation must be calibrated for each of the directions of inspection.

Reference will now be made to FIG. 3, representing a tubular product having a constant cross section with axis X provided with a transverse defect or internal crosswise defect Dti, as well as an ultrasound transducer 5 performing an ultrasound burst the beam of which is reflected on the internal crosswise defect Dti and returns to the transducer 5.

The current detection techniques use ultrasound transducers 5 positioned close to a tubular product having a constant cross section. These sensors are coupled indirectly to the tube via a liquid couplant, generally water. The transducer 5 has a main direction substantially orthogonal to the axis X of the complex tubular product 3 and therefore to the external wall of the tubular product having a constant cross section.

Generally, ultrasound pulses propagate within the thickness of the tubular product up to the internal surface of the wall of said product and perform a plurality of outward and return transits between the internal surface and the external surface of the tubular product. In the absence of a defect, the beam is reflected several times within the complex tubular product 3 and the coefficient of absorption of the metal contributes to damping the ultrasound wave.

In order to perform an ultrasound burst, the transducer 5 is controlled so as to emit an ultrasound wave into the couplant, for example water, refractive index $n_{water}$, with an angle of incidence θi, for example of approximately 17° with respect to the normal of the water/steel interface at the place where the wave meets the interface. This wave propagates in the couplant up to the surface of the tubular product, and a refracted wave propagates in the material of the tubular product, for example steel, with a refractive index $n_{steel}$, at an angle of refraction Or, for example approximately 400. The link between the angle of incidence θi and the angle of refraction Or is expressed by the Snell-Descartes law.

$$\sin(\theta i)/V_{water} = \sin(\theta r)/V_{steel}$$

with $V_{water}$ the velocity of the ultrasound wave in water and $V_{steel}$ the velocity of the wave in steel.

This angle of refraction or angle of insonification of approximately 40° in the material of the tube is a very effective angle for detecting internal or external defects situated on the internal surface and the external surface. In fact, an angle on defect θd of approximately 40° generally makes it possible to ensure that an ultrasound wave reflected by the defect, or echo, performs a reverse path to return to the sensor.

It is understood that the case represented in FIG. 3 corresponds to the conventional case of inspection of a tube having a constant cross section and to the detection of an internal transverse defect Dti. However, when the tube to be inspected comprises segments having different dimensions, and segments on which the inside and/or outside diameters of the tube vary, the internal and/or external surfaces can present slopes and it is therefore more difficult to obtain the desired angle on the defect θd so that the echo of the ultrasound burst returns to the transducer 5.

This is illustrated in FIG. 4, which represents a longitudinal sectional view of a portion of complex tubular product 3 having a variable cross section. The transducer 5 is positioned longitudinally along the axis X so as to emit an ultrasound wave penetrating the complex tubular product 3 on a segment 1n which the slope of the external wall of the tube forms a non-zero angle α with respect to the longitudinal axis X of the tubular product: this is a segment 1n which the outside diameter of the tube varies. Therefore, instead of the ultrasound beam penetrating into the tube wall, the normal to the external surface of the tube forms a supplementary angle α. Therefore this angle α must be taken into account when it is desired to produce an ultrasound beam meeting an internal transverse defect Dti with an angle 40° on defect θd.

FIG. 4 represents an additional difficulty in that the ultrasound wave meets an internal transverse defect Dti located on a segment of complex tubular product 3 in which the internal wall has a slope with a non-zero angle β with respect to the longitudinal axis of the tube. In this case, the angle on defect θd must be equal to the angle of refraction Or incremented by the respective angles of slope of the internal and external walls α and β. For example, it is then necessary to adapt the emission orientation θe so as to ensure that the angle θd=θr+α+β is approximately equal to 400 in order to ensure that the ultrasound burst wave reflected by the transverse defect returns to the transducer 5.

In the field of ultrasound non-destructive testing the following terminology is frequently used:
 "scan" denotes a set of relative tube/sensor positions,
 "increment" denotes the scan period (inversely proportional to the frequency of recurrence or frequency of ultrasound bursts),
 "A-scan" denotes the graph of the electrical voltage measured at the terminals of an ultrasound transducer, with the time-of-flight on the x-axis and a representation of the electrical voltage, also called ultrasound amplitude, on the y-axis,
 "B-scan" denotes an image relating to a given increment value, with the scan corresponding to the ultrasound burst on the x-axis, the time-of-flight on the y-axis, and at each point the converted ultrasound amplitude in greyscale or in colour (electronic scan for a phased array sensor, mechanical scan for a single-element sensor),
 "Echo-dynamic" generally denotes the graph of a curve representing the maximum amplitude received as a function of the incremental position of the transducer, for example the burst number when there is one burst per position of the transducer,
 "C-scan" denotes an image with the equivalent position in a planar space of the burst point of the ultrasound wave on both x-axis and y-axis, converted to greyscale or colour, representing the maximum ultrasound amplitude for this burst recorded in the temporal selector in question from the A-scan ("image amplitude"). In the case of a tube, a point on the x-axis of the C-scan corresponds to a position on the length of the tube and a point on the y-axis corresponds to a position on the circumference of the tube.
  In the case of a flat product, a point on the x-axis of the C-scan corresponds to a position on the length of the flat product and a point on the y-axis corresponds to a position on the width of the flat product.

FIG. 5 diagrammatically represents the time profile of signals received on return, known as A-scan. Such a signal comprises pulses Em of the beam emitted and the pulses of the echoes received on return. The A-scan signal can comprise a series of pulses Em, followed by pulses Int of echoes from the interface between the water and the external surface of the tubular product, then, in the presence of defects on the internal surface of the tube and/or on the external surface thereof, echo signals relating to defects on the internal surface Dv and echo signals relating to defects on the external surface Ds. In practice, the interface echo Int is preponderant over an echo Ds due to a defect on the external surface of the tubular product and masks this echo Ds. This is why the echo Ds of a defect on the external surface is generally received on the beam reflected by the internal surface of the tubular product.

In the presence of a defect on the internal surface of the tubular product, the maximum intensity of an echo Dv is detected if the intensity of the echo exceeds a threshold S1 in a temporal window Fe1.

In the presence of a defect on the external surface of the tubular product, the maximum intensity of an echo Ds is detected if the intensity of the echo exceeds a threshold S2 in a temporal window Fe2.

The echo-dynamic curve is thus the representation of the maximum amplitude of the signal received in a testing window over time for each burst performed. It is alternatively possible for the echo-dynamic curve to be a representation of the maximum amplitude of the received signal as a function of the longitudinal position of the tube.

FIG. 5 illustrates the principle of a detection gate, the purpose of which is to select a portion of the echo signals so as to possibly detect an imperfection.

Each electronic channel comprises a temporal filter FT (for example a sampler blocker) linked to the transducer element in order to isolate successive temporal windows, capable of having an echo relating to a defect investigated (for example an internal or external defect).

The device according to the invention can comprise electronics with a temporal filter module 24 configured to apply at least one temporal filter $FT_i$ (L; A) in order to isolate, within a corresponding period $Tr_i$(L; A), a temporal window $Fe_i$(L; A) in which echoes Dv and/or Ds representative of the presence of defects are likely to be present.

The temporal position and the width of a window $Fe_i$(L; A) depend on the velocity of propagation of the ultrasounds in the metal and on the velocity of propagation in the height of the couplant, for example the height of water, the period of burst Tr, the outside diameter and the thickness of the metal tube.

According to the invention, positions and widths of the temporal windows $Fe_i$(L; A) can be made dependent on the longitudinal position (L) of a transducer, or on the circumferential position (A) of a sensor, or the combination (L; A) of the longitudinal position and the circumferential position of a transducer. In fact, as the tube varies in outside and/or inside diameters, the path of an ultrasound wave can be different as a function of the longitudinal position (L) of the transducer 5. The main varying parameters are therefore: the distance travelled in the couplant, the distance travelled in the steel of the tubular product, the distance of the steel/couplant or steel/air interfaces with respect to the transducer 5, as well as the orientations of the interface surfaces relatively with respect to the sensor. For example, in a first segment of the tube, the path can be shorter than the path of this wave in another segment of the tube in which the thickness of the tube is increased. It is therefore advantageous to adjust position and width of the temporal windows $Fe_i$(L) as a function of the position of the sensor, so as to avoid using wide temporal windows with heavy resource consumption or so as to reduce false detections. Similarly, in a tube having a variable thickness along the circumference thereof, the path of the ultrasound wave will be modified by this variation in thickness as well as by the slope or slopes produced on the external and internal surfaces.

According to another aspect, the device according to the invention can comprise one or more ultrasound transducers 5. The ultrasound transducers 5 comprise transducer elements capable of emitting or receiving ultrasound.

The device according to the invention can comprise, for an ultrasound transducer 5, burst electronics (6) making it possible to perform several bursts for a given position of the transducer 5. Said burst electronics can comprise common components used for each burst carried out, and/or exclusive components reserved for each of the bursts performed at a given position. In other words, the burst electronics can comprise a channel common to the different bursts or a dedicated channel for each burst. In the description hereinafter, mention will be made of an acquisition channel $V_i$ associated with burst number i, regardless of the structure of the electronic components used. Thus a common channel can successively perform the n bursts of the channels $V_i$ for i variant of 1 to n or there may be therein n dedicated channels in order to perform the n bursts. For example, the electronics can be configured to perform from one to eight bursts per position of the transducer 5. Preferably from two to six bursts.

Preferably, the ability to carry out several ultrasound bursts for a given position of the transducer 5 makes it possible to apply to these ultrasound bursts several emission orientations $\theta e_i$(L; A) comprised between a minimum angle of emission of position $\theta e_{mini}$(L; A) and a maximum angle of emission of position $\theta e_{maxi}$(L; A). The ability to perform several ultrasound bursts for one and the same position of the ultrasound transducer (5) with different emission orientations makes it possible to compensate for unintentional variations in the object to be inspected. This will be illustrated in the examples.

The acquisition channels $V_i$ are therefore configured to perform a series of ultrasound bursts for a given position of the transducer 5.

Figure 12:
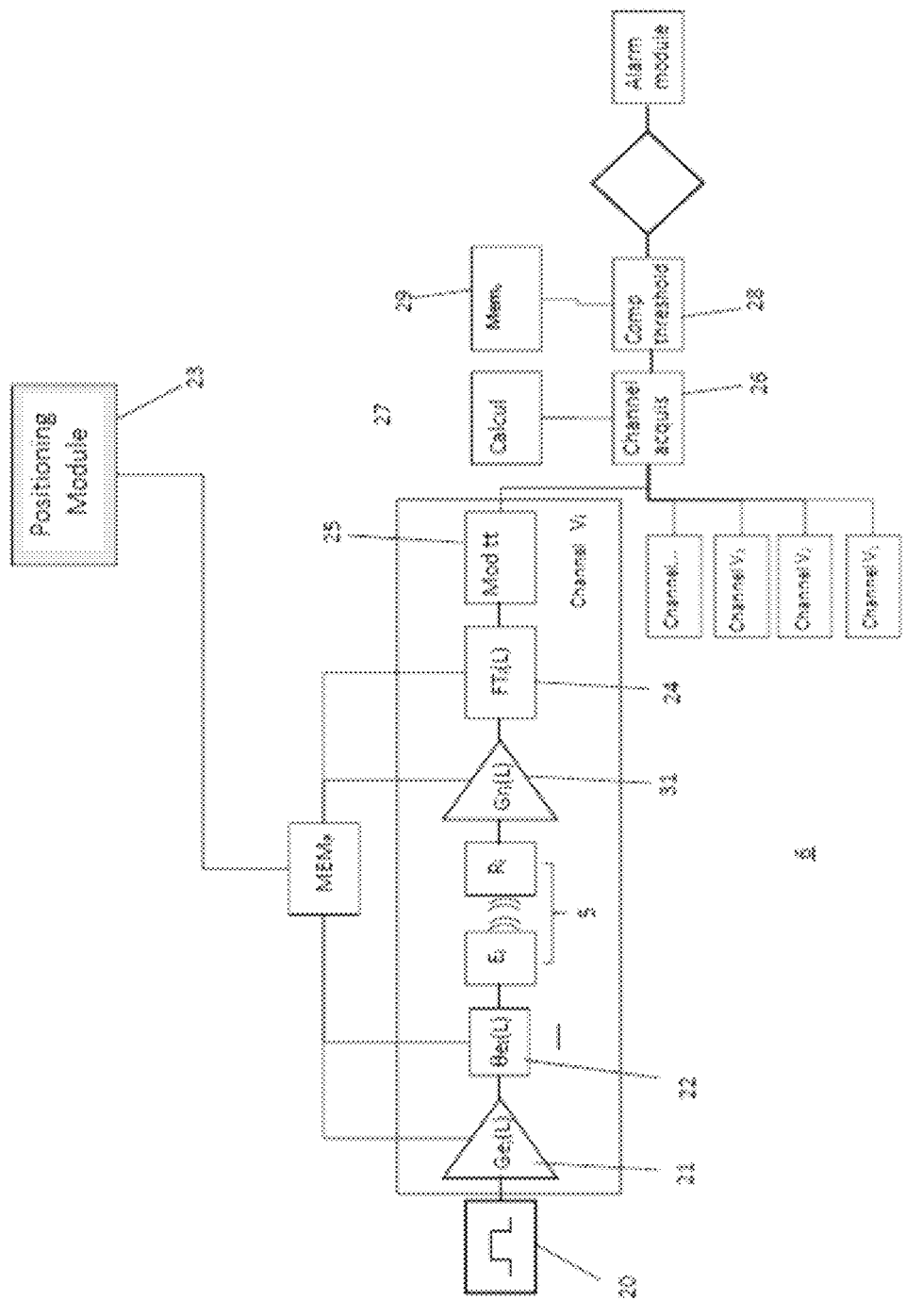
FIG. 12 is a flowchart of an acquisition route and a part of the processing electronics according to an embodiment of the invention.

FIG. 12 is a flowchart of the control and processing electronics 6, associated via an electronic circuit with an ultrasound transducer 5 for non-destructive testing in an example installation capable of implementing the invention.

The purpose of this chart is to better show certain specific features of the invention; this view is consequently simplified and is not specific to a particular type of sensor, however a person skilled in the art will know how to adapt this chart as a function of the type of sensor used in the device.

Channel $V_i$ in FIG. 12 comprises a pulse generator 20 controlling the emission of the transducer elements.

The pulse generator 20 can be linked to an emission amplification stage 21 the function of which is to amplify the pulse signal by applying an emission gain $Ge_i$(L). This amplification stage 21 makes it possible to amplify the electrical signal generating the ultrasound burst.

This amplification stage 21 can be configured to adapt the emission gain $Ge_i$(L) as a function of the position of the sensor, in particular of the longitudinal position L of the sensor 5, and for this reason, the amplification stage 21 can be linked to a parametric memory MEMp containing amplification values with respect to a longitudinal position (L) of the sensor 5.

The emission amplification stage 21 can be linked to a directional stage 22 configured to apply an orientation $\theta e_i$(L) to the ultrasound burst beam. Preferably, this stage applies a temporal law of activation of the unitary transducers of the ultrasound sensor 5. Alternatively, in particular when the sensor 5 is of the single-element type, this stage controls an orientation module of the sensor 5, for example in the form of a motorized support plate of the sensor.

The emission amplification stage 21 and the directional stage 22 are with respect to the transducer emission elements E and are configured to allow an ultrasound burst to be sent having a power corresponding to the emission gain $\theta e_i(L)$ applied and a direction corresponding to the chosen emission orientation $\theta e_i(L)$. The directional stage 22 can be linked to a parametric memory MEMp containing orientation values with respect to a longitudinal position L of the sensor 5.

Thus, the emission amplification stage 21 and the directional stage 22 can be linked to the parametric memory module MEMp containing the orientation $\theta e_i(L)$ and emission gain $Ge_i(L)$ parameters that are functions of the longitudinal position of the sensor and of the type of defect to be characterized.

The positioning module 23 is configured to send to the parametric memory module the position of the sensor in the form of a longitudinal position (L) and a circumferential position (A). The positioning module 23 comprises positioning electronics and at least one position sensor 7a (not shown in FIG. 12). The positioning module 23 indicates to the parametric memory module MEMp which are the values of the active parameters in the channel Vi for a burst intended to detect the defects of a certain type as a function of the position of the sensor 5.

Figure 13:
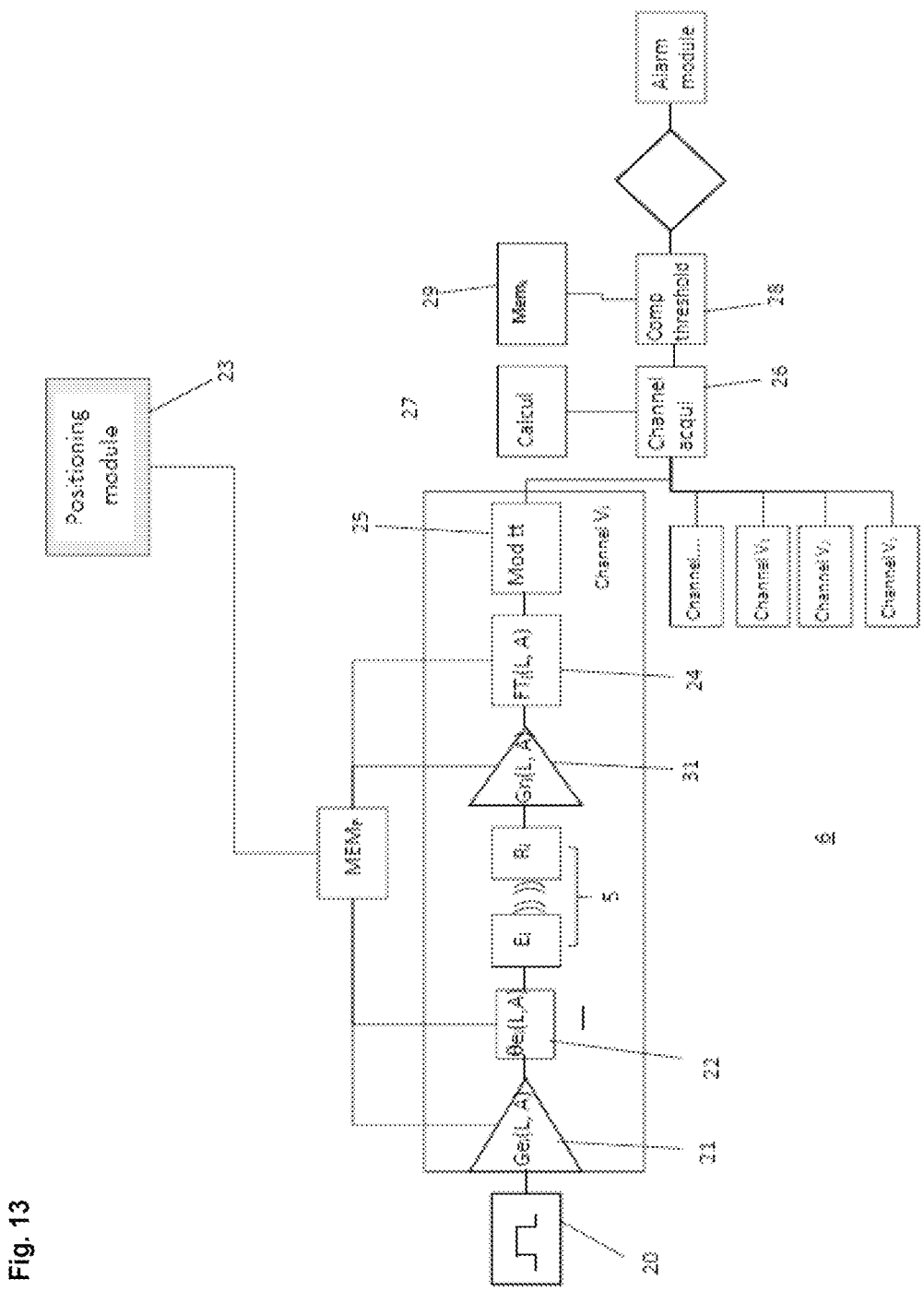
FIG. 13 is a flowchart of an acquisition route and a part of the processing electronics according to another embodiment of the invention.

FIG. 13 represents the flowchart of the control and processing electronics 6 of the embodiment of the invention capable of adapting the ultrasound burst parameters as a function both of the longitudinal position L and of the circumferential position A of the sensor 5. The emission 21 and reception 31 amplification stages can be configured to apply respectively an emission $Ge_i(L; A)$ or reception $Gr_i(L; A)$ gain as a function of the longitudinal position L and of the circumferential position A of the sensor 5. Similarly, the directional stage 22 is configured to apply an orientation $\theta e_i(L; A)$ to the ultrasound burst beam, and the temporal filter $FT_i(L, A)$ is configured to apply a temporal window as a function of the longitudinal and circumferential position of the sensor 5. In this embodiment, at least one of these parameters varies as a function of the longitudinal position L of the sensor 5 and at least one of these parameters varies as a function of the circumferential position A of the sensor 5. The parametric memory MEMp is in that case adapted to contain the appropriate parameters. The positioning module 23 is then configured to send to the parametric memory module the longitudinal (L) and circumferential A position of the sensor.

The position sensor 7a can be an incremental encoder, a rack encoder, a linear encoder, a draw-wire encoder, a laser velocimeter, an encoder wheel or an incremental encoder wheel.

Alternatively, the positioning module can comprise, instead of a position sensor (7a) an interval timer 7b. This alternative is possible because automated test benches are equipped with means for relative movement of the tube with respect to the transducers, making it possible to establish a repeatable relative trajectory determined over time. However, the interval timer 7b may be less accurate than the position sensor 7a.

As explained previously, in a first variant, the position of the sensor 5 corresponds to the longitudinal position (L) of the sensor 5. In a second variant, the position of the sensor 5 corresponds to the longitudinal position (L) and the circumferential position (A) of the sensor 5. The positioning module 23 is then configured to send to the parametric memory module the longitudinal position (L) and the circumferential position (A) of the sensor. In a third variant, the position of the sensor 5 corresponds to the circumferential position A of the sensor 5. The positioning module 23 is then configured to send to the parametric memory module the circumferential position (A) of the sensor.

The emission transducer $E_i$ of the sensor 5 can emit a directed beam of ultrasound waves. The channel $V_i$ comprises a reception transducer $R_i$, which can be the same transducer as the emission transducer $E_i$ or another transducer. A reception transducer $R_i$ can receive any echo or echoes of the emitted signals, and convert them to a corresponding electrical signal. The reception transducer $R_i$ can be linked to a reception amplification stage 31, the function of which is to amplify the electrical signal received by the reception transducer $R_i$.

The reception amplification stage 31 can be configured to apply to the received signal an amplification with a reception gain of the channel $V_i$ denoted $Gr_i(L)$, which is chosen as a function of the longitudinal position (L) and/or of the circumferential position (A) of the transducer 5 and of the nature of the imperfection investigated. The ability to modulate the gain of this reception amplification stage makes it possible to improve the detection of defects, similarly to the configurable emission amplification. When this stage is configured with analogue amplification, this has the advantage of amplifying the reception signal while to some extent limiting the amplification of the reception noise. When this stage is configured with digital amplification, this makes it possible to amplify the reception signal but has the drawback of greater amplification of the noise than with analogue amplification.

The reception transducers $R_i$ can also be linked to a temporal filter module 24 configured to apply one or more temporal filters ($FT_i(L)$). Each temporal filter $FT_i(L)$ isolates a temporal window in which the echo of the ultrasound burst is likely to be present. The function of a temporal filter $FT_i(L)$ is thus to select the portion of the reception signal corresponding to the temporal window in which an echo Dv, Ds of an ultrasound burst deflected by a typical defect is likely to return to the reception transducers R and to be able to specifically process the signal over a chosen time period. This makes it possible to reduce the memory resources and processing capacity of the electronics, and this also makes it possible to avoid measuring an echo that may not correspond to the echo expected from an ultrasound burst performed for the purpose of detecting a type of defect, for example a secondary echo.

The temporal filter module 24 can be linked to the parametric memory module MEMp containing the position parameters of the temporal filters as a function of the longitudinal position of the sensor (L) and of the type of defect to be characterized, and optionally in a variant, of both the circumferential position (A) of the sensor and of the longitudinal position (L) thereof.

The memory MEMp can be configured to contain data relating to the positions and widths of the windows $Fe_i(L)$ as a function of the position (L) of the sensor. Correspondingly, the temporal filter module 24 comprises temporal filters $FT_i(L)$ configured to modify the positions and widths of the temporal windows $Fe_i(L)$ for each acquisition channel $V_i$.

In a first variant, the detection gates have the same duration or length for one and the same type of defect. The representative variable is then the moment of opening the detection gate, or the start position thereof, which is generally implemented in the form of a delay with respect to the burst performed.

In a second variant, the start position and the end position of the detection gate are modified, thus being able to generate detection gates of variable length. In this variant, two representative variables are thus used in order to configure the values $FT_i(L)$.

The temporal filter module 24 is followed by a processing module 25, comprising a threshold detector that references the intensity maximum of the received signal Ds, Dv. This processing module 25 is linked to an acquisition memory of the channels 26 in order to record the maximum intensity of the echo of each channel $V_i$.

When the channels $V_i$ have their own electronics, an acquisition memory of the channels 26 is linked in the same way to the analogue channels of the device, for example the memory 26 is linked to each of the channels $V_i$ $V_2$ $V_3$, ... $V_8$.

When there is a single electronics for several bursts, the module 26 is configured to store the maximum intensity of the signal received from each channel $V_i$ associated with an ultrasound burst i.

The acquisition memory of the channels 26 can be linked to a calculation module 27 configured to generate echo-dynamic curves. The calculation module 27 can also generate A-scans, B-scans from the received signal of greatest intensity among the i ultrasound bursts performed at a given position for a chosen type of defect, and this calculation module 27 can also generate a C-scan of the inspected tubular product.

The acquisition memory of the channels 26 can be linked to a threshold comparator 28. The threshold comparator 28 compares the intensity maximum of the received echo signal and the alert trigger threshold level stored in a dedicated alert threshold memory 29. This comparator can trigger the operation of an operator alert module 30.

In another embodiment of the invention, the electronics 6 is configured to define at least one ultrasound burst parameter as a function of the longitudinal (L) and of the circumferential (A) position of the ultrasound emission means so as to detect defects in the tube wall, said at least one parameter being chosen from the burst emission orientation $\theta e_i(L; A)$, the gain $G(L; A)$ or the position of the temporal filter $FT_i(L; A)$.

The applicant carried out several series of tests on sample tubular products provided with defects produced specifically in order to determine the quality of detection of these defects.

Figure 6A:
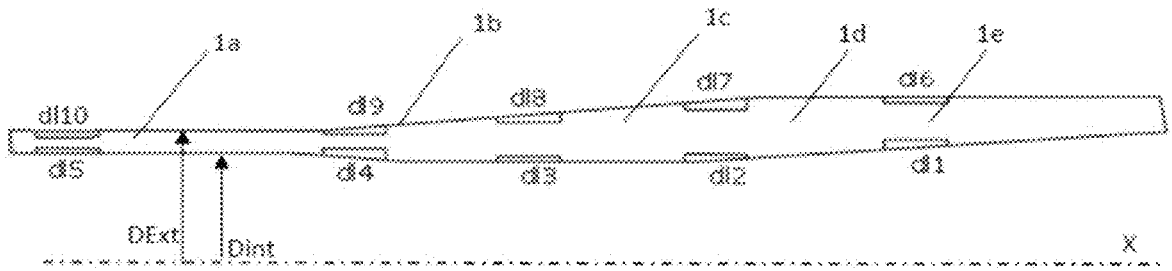
FIGS. 6a-c show a detail cross section of a sample tube having a variable cross section provided with longitudinal defects and two comparative graphs of the responses of ultrasound bursts of a device of the state of the art and of an embodiment of the invention, according to the aspects of the signal-to-noise ratio of the ultrasound echoes and of the amplitude of the ultrasound echoes.

In a first example, the sample tube (1) with axis (X) in FIG. 6a has several segments 1a to 1e arranged such that:
Segment 1a comprises constant outside (Dext) and inside (Dint) diameters.
Segment 1b comprises non-constant outside (Dext) and inside (Dint) diameters, the outside diameter (Dext) increasing from segment 1a to segment 1c and the inside diameter decreasing in the same direction.
Segment 1c comprises an outside diameter increasing from segment 1b to segment 1d and the inside diameter is constant
Segment 1d comprises an outside diameter and an inside diameter both increasing from segment 1c to segment 1e
Segment 1e comprises a constant outside diameter and an inside diameter increasing from segment 1d
Longitudinal notches $dl_i$ (identified as $dl_l$ to $dl_{10}$) of 25 mm in length were produced on the sample tube in FIG. 6a.

The depth of the notches is constant and the bottom wall of the notches is therefore substantially parallel to the surface in which these notches are produced, which is not shown in FIG. 6a.

The tube in FIG. 6a was subjected to an inspection by an automated defect detection device of the state of the art, then with a device according to the invention, in order to measure the intensities of the return echoes of each longitudinal notch $dl_i$. In this device according to the invention, only the angle of emission $\theta e(L)$ was varied on an acquisition channel.

Figure 6B:
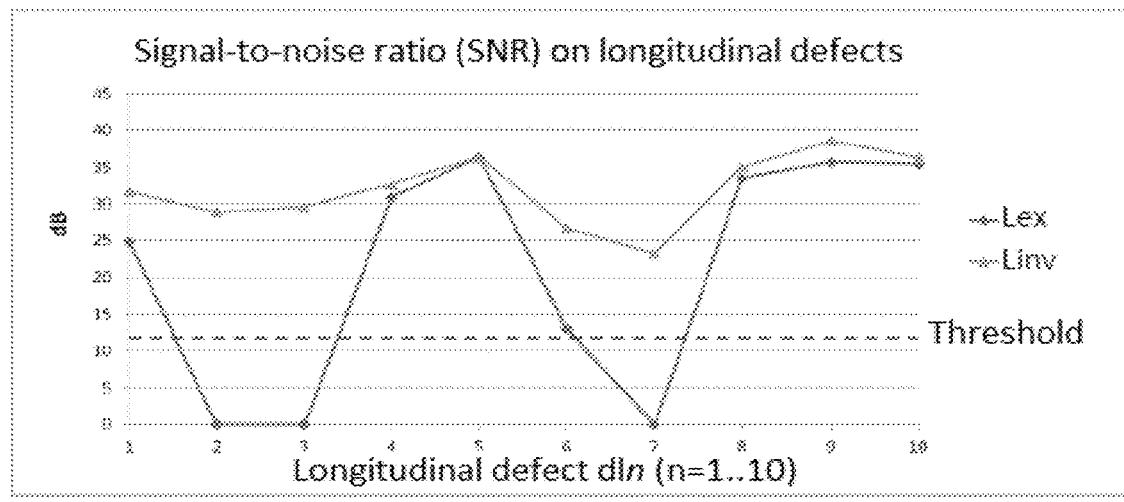
Figure 6C:
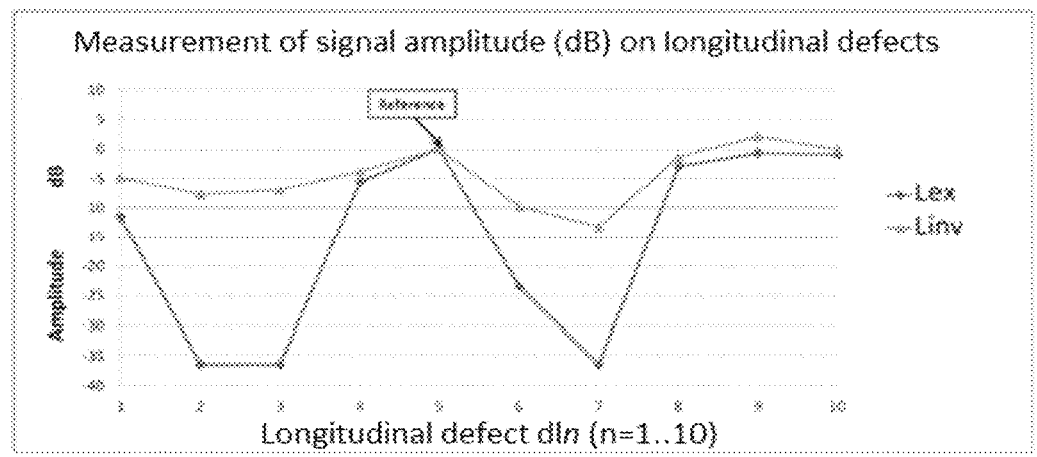

The result of this test is shown in FIGS. 6b and 6c, which represent graphs with the number of the notch $dl_i$ corresponding to the notches in FIG. 6a on the x-axis, and the signal-to-noise ratio for FIG. 6b and the amplitude loss in dB with respect to the reference notch No. 5 in FIG. 6c, on the y-axis.

The graph 6b represents three curves:
the threshold curve delimiting a minimum signal-to-noise ratio of a chosen notch at 12 dB,
the curve of the signal-to-noise ratios recorded with a device of the state of the art (Lex).
the curve of the signal-to-noise ratios recorded with a device according to the invention (Linv).

The graph 6c represents two curves:
the curve of amplitude loss in dB with respect to the reference notch No. 5 recorded with a device of the state of the art (Lex),
the curve of amplitude loss in dB with respect to the reference notch No. 5 recorded with a device according to the invention (Linv).

It is apparent that notches 5 and 10 are recorded at the same level by the device of the state of the art and by a device according to the invention, which is usual, as the notches 5 and 10 are situated in a segment of the tube having a constant cross section and the different construction of the two devices is inoperative in this segment.

On the other hand, notches 2, 3, 6, 7 send very faint echoes in the device of the state of the art, with levels below the threshold of detectability, while the device according to the invention makes it possible to obtain echoes of a high level, greater than 23 dB in all cases.

It is therefore deduced therefrom that the device of the state of the art does not detect the notches 2, 3, 7 or even 6 in production inspection mode, while the device according to the invention makes it possible to detect these notches.

FIG. 6c shows the loss of amplitude between a reference notch, here dl5, and the intensity of the echoes on the other notches. The level of the signal is fixed conventionally at 0 dB on the reference notch No. 5 (or dl5). The smallest intensity received is less than 13 dB with the device according to the invention, while the discrepancy reaches 35 dB over 3 defects with the device of the state of the art.

Figure 7A:
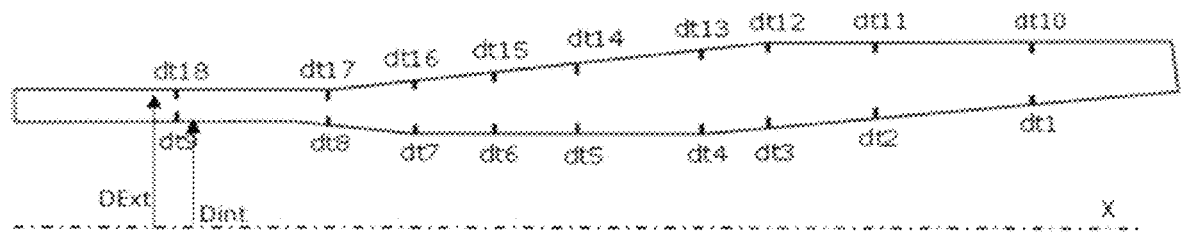
FIGS. 7a-e show a detail cross section of a sample tube with a variable cross section provided with transverse defects and comparative graphs of the quality of the responses of the ultrasound bursts onto transverse defects between a device of the state of the art and a device according to an embodiment of the invention, according to the aspects of the signal-to-noise ratio of the ultrasound echoes and of the amplitude of the ultrasound echoes, in two inspection directions.

The sample tube in FIG. 7a is provided with transverse notches $dt_i$ ($dt_1$ to $dt_{18}$) on a series of varied segments similar to the example described above. It is recalled that the transverse defects can be detected using bursts having a chosen orientation in a longitudinal plane, such as presented in FIGS. 3 and 4. The transverse defects can be detected in both longitudinal directions. FIGS. 7b, 7c, 7d, 7e show the values of the signal-to-noise ratio and the amplitudes of the echoes measured in a first direction of inspection then in the second direction of inspection, for a device of the state of the art and the device according to the invention used in the test in FIGS. 6a-c, i.e. only varying the angle of emission $\theta e(L)$ on an acquisition channel.

Figure 7B:
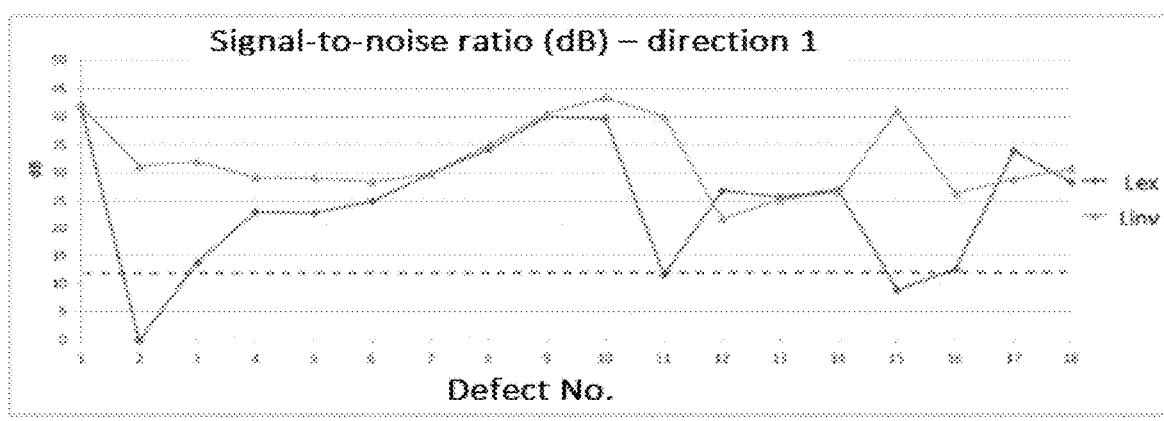
Figure 7C:
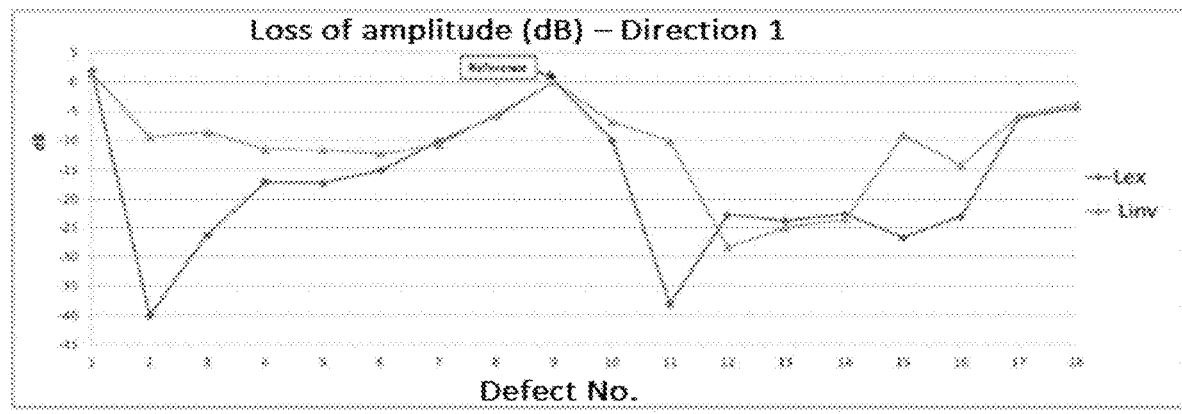
Figure 7D:
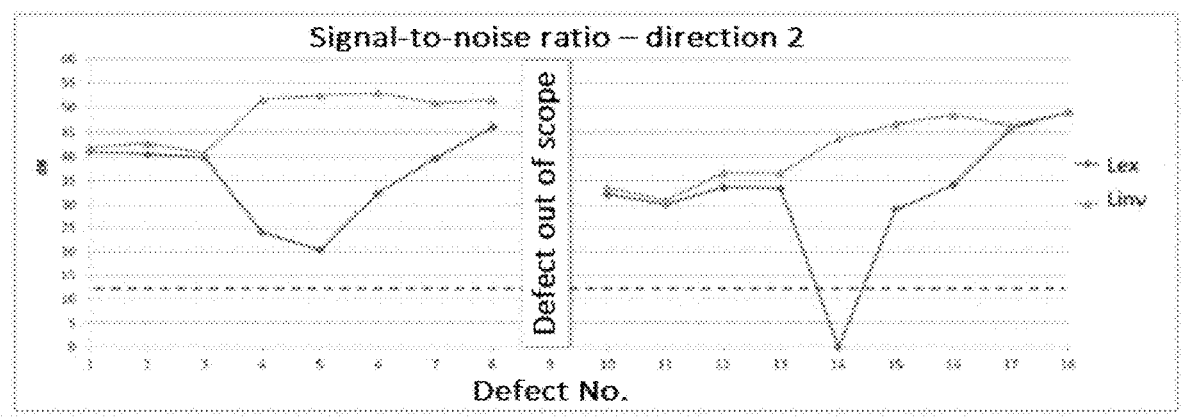
Figure 7E:
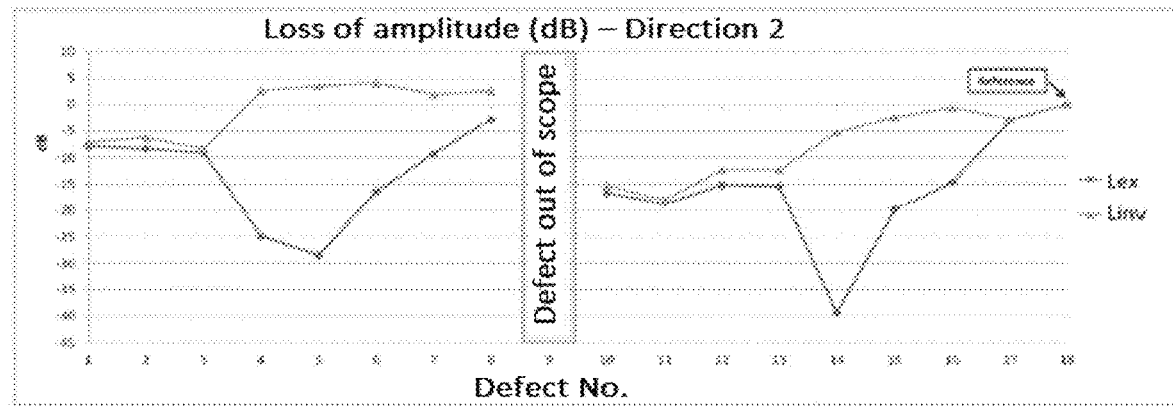

It is noted that for the inspection in a first direction in FIGS. 7b, 7c, there is a clear improvement in the return amplitude measured on certain transverse defects, internal or external. More particularly, with the device of the state of the art, the defects referenced $Dt_2$, $Dt_3$, $Dt_{11}$, $Dt_{15}$ and $Dt_{16}$ are detectable to a limited extent or may not be detected since the signal-to-noise ratio of the received echoes thereof is equal to, or less than 12 dB.

With the device according to the invention, all these defects are detected. In addition, the level of the signal-to-noise ratio of the received echoes is high, greater than 20 dB, which makes it possible to have a correctly differentiated echo of the background noise. The device according to the invention also makes it possible to have an improved homogeneity between the different recorded intensities of the echoes on the internal transverse defects, with a difference of less than 12 dB between the defect $Dt_1$ and the defect $Dt_6$. This difference is of less than 25 dB on the external defects $Dt_{10}$ and $Dt_{12}$.

FIGS. 7b-e demonstrate that a device according to the invention that varies the angle of orientation of a burst makes it possible to obtain better results than the device of the state of the art, in particular on the segment of tube the cross section of which has an outside diameter that varies longitudinally. In the detection direction of FIG. 2, the homogeneity of the recorded intensities of echoes is improved both for the internal and external transverse defects, with deviations of less than 12 dB on the signal-to-noise ratio as well as on the internal or external transverse defects.

It will be seen below with the examples in FIGS. 9 to 11 that a device according to the invention can also reach a very good level of homogeneity by varying both the emission orientation $\theta e_i$ (L) and the gain $G_i(L)$.

FIG. 7c shows that there is still a loss of amplitude of echoes on certain defects that can be considered significant, and especially for the external defects for which it is recalled that they are detected via the echo of an ultrasound beam reflecting on the internal surface of the tubular product; the path is therefore particularly long and the attenuation of the return echo is more sensitive to the variations in the inside and outside diameters. The attenuation may still be of the order of 25 dB on the defects 12 to 14. This response can therefore be further improved, which will be disclosed hereinafter in an embodiment in which the electronics 6 is arranged to vary at least two ultrasound burst parameters as a function of the longitudinal position (L) of the ultrasound emission means chosen from the burst emission orientation $\theta e_i(L)$, the gain $G_i(L)$ or the position of the temporal filter $FT_i(L)$.

Figure 8A:
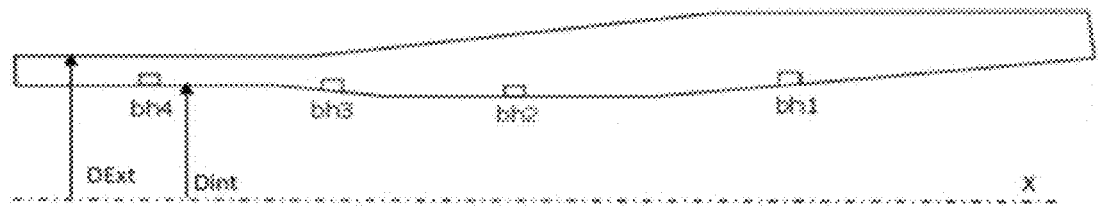
FIGS. 8a-c show a detail cross section of a sample tube with a variable cross section provided with defects of the flat-bottom hole type; as well as comparative graphs of the quality of the responses of the ultrasound bursts onto flat-bottom defects between a device of the state of the art and a device according to an embodiment of the invention, according to the aspects of the signal-to-noise ratio of the ultrasound echoes, then of the amplitude of the ultrasound echoes.
Figure 8B:
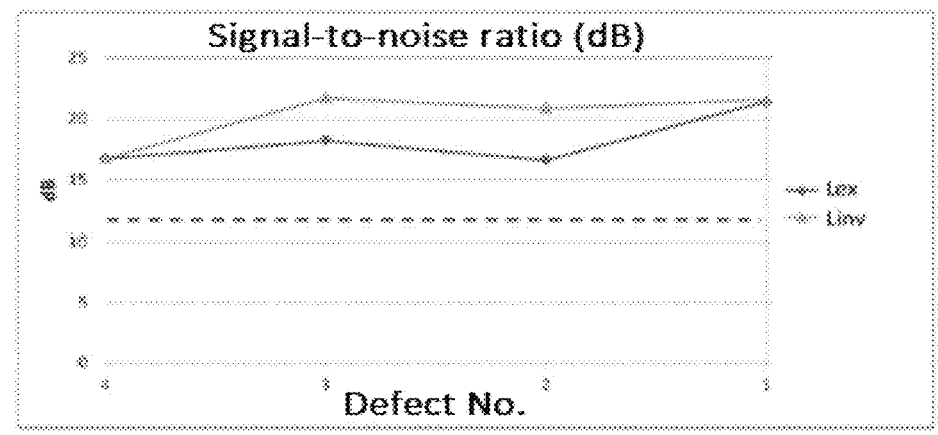
Figure 8C:
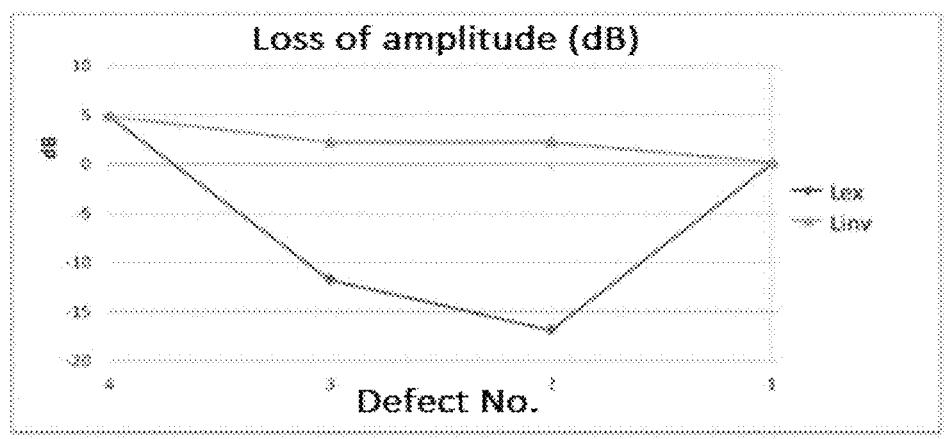

FIGS. 8a and 8b-c respectively show a sample tube in which 4 flat-bottom holes $Tfp_i$ were produced, used as standard defects with respect to the detection of defects in the wall known as "delaminations", and the comparative curves of a device of the state of the art Lex and a device according to the invention Linv, both by a measurement of the signal-to-noise ratio (FIG. 8b) and by a measurement of the amplitude of the signal in dB (FIG. 8c). The electronics of the device is arranged to vary the burst orientation parameter $\theta e_i$ (L) and the position of the temporal filter $FT_i(L)$ along the longitudinal axis, without varying the gain, similarly to the tests carried out and disclosed within the framework of FIGS. 6 and 7.

The flat-bottom holes $Tfp_i$ have a diameter of 6 mm and a depth equal to half of the local thickness of the piece. It was decided to produce the bottom parallel to the axis of the tube, not with bottoms parallel to the internal wall of the tube.

FIG. 8b shows an improvement of approximately 5 dB in the signal-to-noise ratio on a segment 1n which the outside diameter varies longitudinally. FIG. 8c shows an improvement of more than 15 dB in the amplitude level of the return signal on this same segment. Variation on a segment of the inside diameter alone does not seem to affect the quality of measurement as regards the detection of flat-bottom holes.

These results show that a device according to the invention makes it possible to also improve the detectability of the defects of the delamination type, since the intensities of the return echoes is greater for the flat-bottom holes $Tfp_3$ and $Tfp_2$.

No difference is noted on the flat-bottom holes $Tfp_1$ and $Tfp_4$, as these holes are produced on segments of tube having a constant outside diameter, and the slope of the internal wall has no effect on the measurement, as the ultrasound burst is directed onto the flat bottom. The improvement in the situation arises from the orientation choice of the emission orientation $\theta e(L)$ and of the position of the detection temporal filters $FT_i(L)$ as a function of the longitudinal position of the sensor.

Other sample tubes with different thicknesses and variation configurations were tested and present similar results, i.e. showing a significant improvement in the detectability of defects of all types with a device according to the invention compared to a device of the state of the art.

Figure 9:
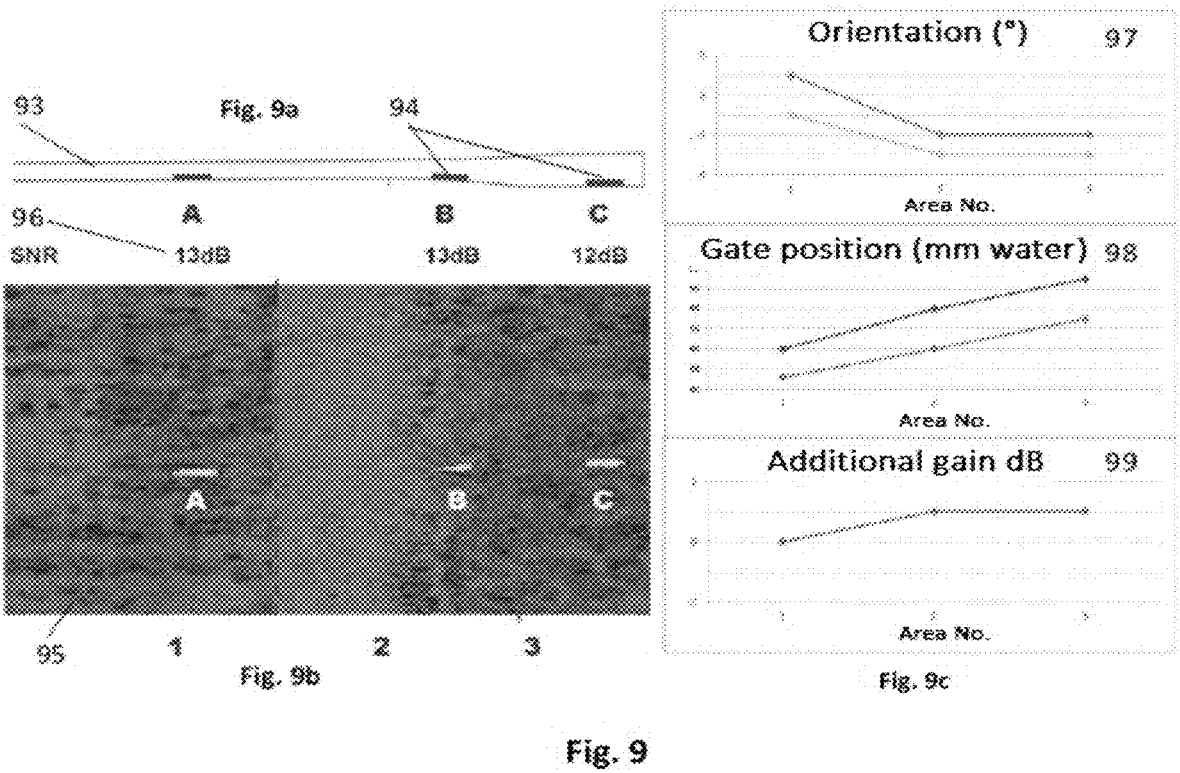
FIG. 9 represents an example implementation of an embodiment of the invention on a sample provided with defects of the internal longitudinal notch type and the corresponding C-scan obtained.

FIG. 9 is composed of FIGS. 9a, 9b, 9c and is intended to show a complete test assembly with a representation in FIG. 9a of a tubular product profile having varying outside and inside diameters, provided with three internal longitudinal notches denoted A, B, C.

FIG. 9b represents a C-scan 95 obtained after scanning the tubular sample 93 by a device according to an embodiment of the invention, in which the three ultrasound burst parameters Vi vary as a function of the longitudinal position of the ultrasound sensor 5.

Three zones are apparent in the C-scan 95 in FIG. 9b, corresponding to three sets of inspection parameters. These sets of parameters are shown in FIG. 9c. The graph 97 shows the minimum and maximum values of the angle of emission $\theta e_i$ (L) for each zone, and it should be understood that all the values per 3° increment between the minimum value and the maximum value are inspected. Thus, in zone 1, the angle of emission $\theta e_i(L)$ varies between 00 and 6°. Three bursts are performed for each inspection position via three electronic channels with $\theta e_1([1])=0°$; $\theta e_2([1])=3°$; $\theta e_3([1])=6°$. The notation [1] replaces all the axial and circumferential positions that the sensor 5 reaches in zone 1 for the purposes of the inspection. In zone 2, two bursts are performed per position at −6° and at −3°. These values are the same in zone 3. With reference to the detection of longitudinal notches, a person skilled in the art understands that the orientation of the ultrasound beam emitted in the case of inspection of longitudinal defects comprises a transverse component substantially contained in a cross section of the tube, and obtained by a mechanical orientation of the ultrasound transducer 5, with a "mechanical angle" θm chosen at approximately 17° with respect to a normal to the axis of the tubular product passing through the meeting point between the beam emitted and the external surface of the tubular product, as well as a longitudinal component corresponding to the angle of emission $\theta e(L)$ obtained in the embodiment in FIG. 9 by electronic control of a phased array transducer. In the case of this inspection, the mechanical angle θm is fixed while the angle of emission $\theta e(L)$ varies as a function of the longitudinal position L of the transducer 5.

The graph 98 shows the opening and closing values of the temporal window $FT_i(L)$ and therefore the positioning of the detection gate for each zone, given in mm in water. A gate in zone 3 is retarded with respect to a gate in zone 2 which is itself later than a gate in zone 1. This makes it possible to take into account a longer path of the ultrasound wave in zone 3 where the longitudinal notch C is the furthest away from the transducer 5 in comparison with zone 1 where the longitudinal notch A is closer to the transducer 5.

The gain $G_t(L)$ and the variation thereof with respect to the longitudinal position of the transducer 5 is represented by the graph 99. The gain is increased by 1 dB in zones 2 and 3 with respect to the gain used in zone 1. In this example, it is the reception gain $Gr_t(L)$ that is modified as a function of the longitudinal position of the transducer 5.

The C-scan 95 obtained shows that all the longitudinal notches are detected satisfactorily, and that there is no unwanted echo giving rise to a "phantom" defect. In addition, the signal-to-noise ratio 96 is very homogenous over the three defects, at 13 or 12 dB.

Figure 10:
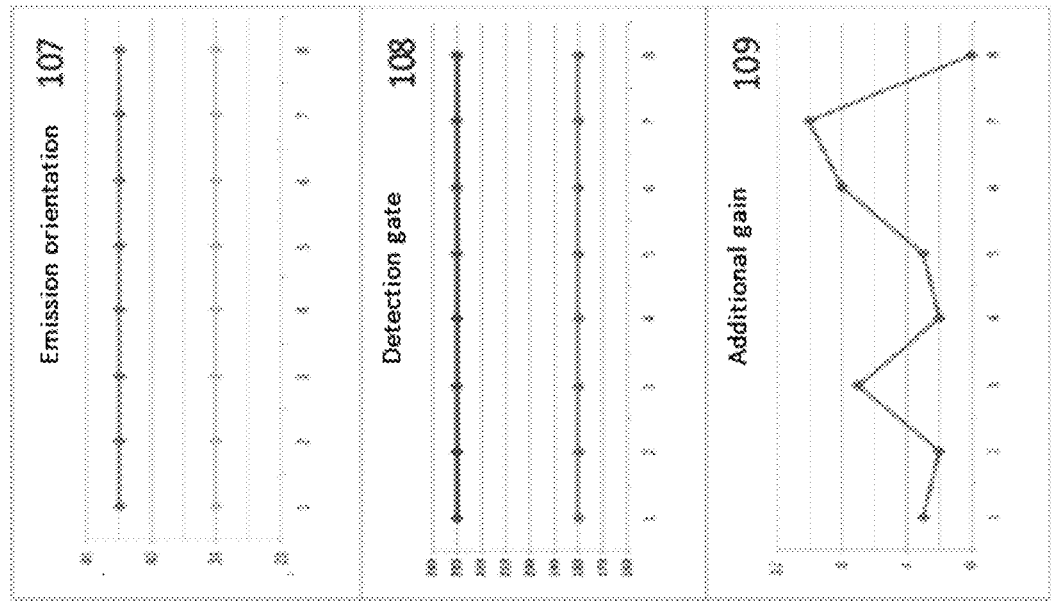
FIG. 10 represents, similarly to FIG. 9, another example implementation of an embodiment of the invention and the corresponding results obtained on the detection of internal transverse defects in a direction of detection.
Figure 10:
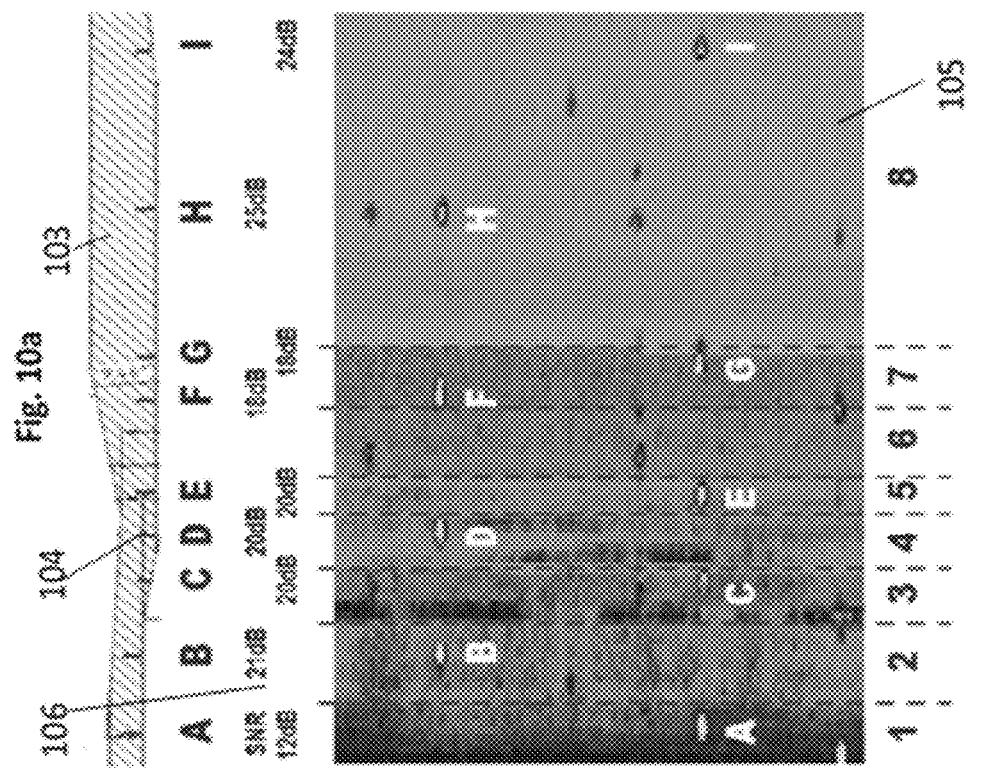

FIG. 10 is composed of FIGS. 10a, 10b, 10c, and shows an example of the result obtained by implementation of the invention on the detection of internal crosswise defects by varying only the gain of the ultrasound beam. Here the piece is inspected in the direction 1, i.e. scanning from defect A to defect I.

FIG. 10a shows a partial cross section of a tubular product profile 103 provided with transverse notches 104 distributed longitudinally over the internal surface of the tubular product 103 and referenced by the letters A to I. Each notch has a length of 10 mm.

FIG. 10b shows the C-scan 105 resulting from inspection of the tubular product 103 by a device according to the invention. This C-scan makes it possible to clearly identify each notch A to I. The device according to the invention made it possible to identify all these notches. Numbered zones 1 to 8, corresponding to a virtual division of the tubular product along the longitudinal axis, are shown on the C-scan 105 in FIG. 10b. These zones correspond to sets of parameters comprising the emission orientation $\theta_j e(L)$, the positioning of detection gates $FT_i(L)$ and the gain $G_t(L)$. In combination with the C-scan 105, the average signal-to-noise ratio (SNR) 106 measured on each detected defect is shown.

FIG. 10c shows the values of the parameters for each zone 1 to 8. Within the framework of the example in FIG. 10, the emission orientation is chosen with values represented in the graph 107, the minimum and maximum values are the same for each zone, namely respectively between 34° and 43°. The device is configured to produce bursts every 3° between the minimum and maximum boundaries. Consequently, for each burst position, the device performed 4 bursts in total with the following angles: 34°, 37°, 40°, 43°. The orientations of the bursts are thus invariable regardless of the longitudinal positioning (L) of the sensor 5 used.

FIG. 10c also shows the positioning of the detection gates in 108. The position values of these gates are given in millimetres in water which is the couplant medium chosen for the experiment. These values are the same in all of the zones 1 to 8. The positions of the detection gates are thus invariable regardless of the longitudinal positioning (L) of the sensor 5 used.

FIG. 10c shows, via the graph 109, for each zone 1 to 8, the gain values in dB additional to the base gain in order to form the gain $G_t(L)$. The additional gain is for example 3 dB in zone 1, 7 dB in zone 3, and 10 dB in zone 7. The gain $G_t(L)$ is the same for each of the 4 bursts of different orientation performed at a given longitudinal position (L). Thus, in zone 1, for a given position, a first burst is performed at an angle of emission in the steel of 34° and with an additional gain of 3 dB, a second burst is performed at 370 with an additional gain of 3 dB, a third at 40° and 3 dB, and a fourth burst at 430 and 4 dB.

The C-scan 105 in FIG. 10b shows that variation of the gain $G_t(L)$ alone makes it possible to detect all the imperfections, and thus makes it possible to obtain a first satisfactory result. However, the C-scan obtained has a non-homogenous signal-to-noise ratio that varies between 18 and 25 dB according to the zone. The C-scan shows other defects, which correspond to notches made on the same tubular component for other experiments, for reasons of economy.

Figure 11:
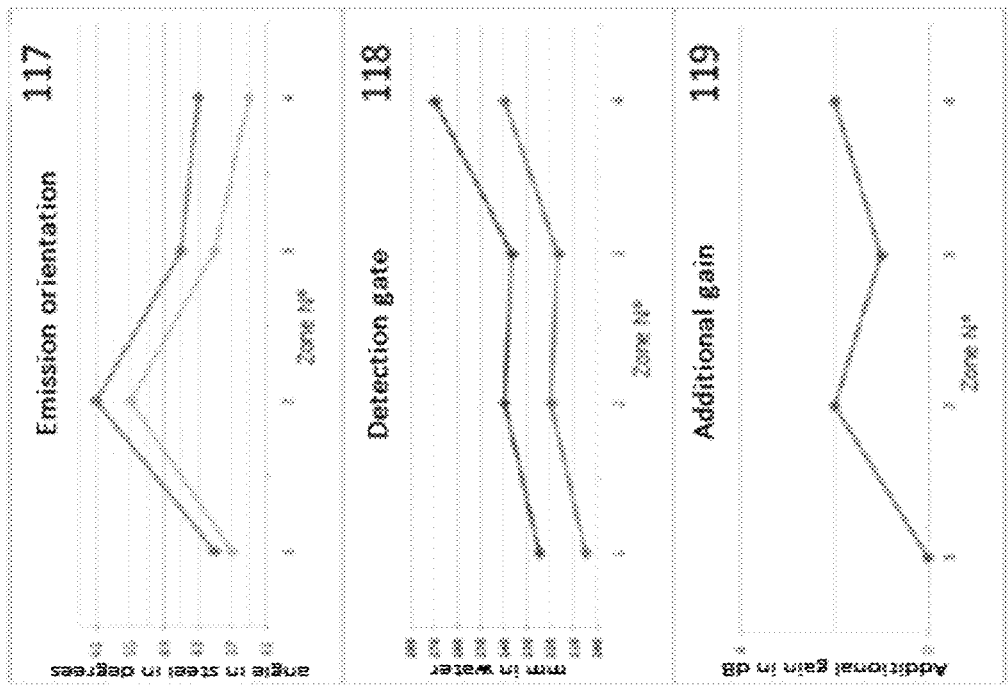
FIG. 11 represents, similarly to FIG. 9, another example implementation of an embodiment of the invention and the corresponding results obtained on the detection of internal transverse defects in a direction of detection.
Figure 11:
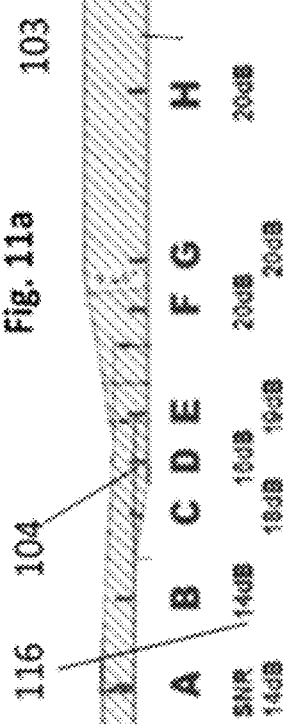
Figure 11:
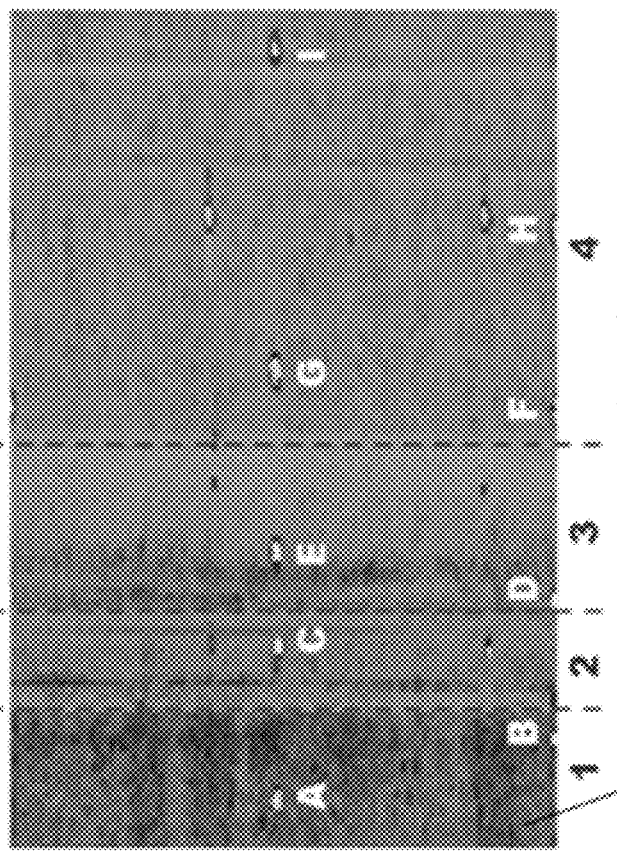

FIG. 11 shows a second test conducted, with the same tubular product 104 provided with notches A to I, the inspection being carried out this time in direction 2, that is with a scan of defect I towards defect A, with a device according to the invention in which the set of parameters is different from that used in the framework of FIGS. 10a-c, in that it uses a variation of the three parameters along the longitudinal axis of the tubular product 103. The fresh set of parameters is represented in FIG. 11c and the corresponding results obtained are represented in FIG. 11b.

The set of parameters in FIG. 11c is divided along the longitudinal axis of the tubular product into 4 zones numbered 1 to 4, i.e. half as many zones as previously shown in FIG. 10a-c.

FIG. 11c shows the development of the gain $G_t(L)$, in graph 119, representing the additional gain applied in each zone, in dB, with respect to a base gain value that is chosen as reference gain for the inspection. The additional gain is thus zero in zone No. 1, 2 dB in zone No. 2, 1 dB in zone No. 3, and 2 dB in zone No. 4. In this example, these gain variations make it possible to compensate for a longer path of the ultrasound waves, or for example in zone 2 in FIG. 11a-c, for compensating a weaker response from the transverse notch C which is tilted and which for this reason may more weakly reflect the signal in the burst direction.

FIG. 11c shows in 118 that the positioning of the detection gates $FT_i(L)$ is different according to each zone. This positioning is for example between 220 mm and 240 mm in water in zone 2 and is between 240 mm and 270 mm in zone 4. A detection gate in zone 4 is then not only positioned later than a gate in zone 2, but is also wider than a gate in zone 2.

FIG. 11 shows in 117 the emission orientations of the bursts for a given position, representing the maximum value and the minimum value of the angle of emission in steel in degrees per zone of zone 1 to zone 4, and by carrying out bursts at these extreme values and also by increment of 3° between the two extreme values, is different according to the zones. The number of bursts per zone also varies. In fact, in zone No. 1, there are two bursts per position at angles of 37° and 40°; in zone No. 2, 3 bursts are performed per position with angles of 55°, 58°, 61°; in zone No. 3, there are also 3 bursts at 40°, 43°, 46°; and finally in zone 4, 4 bursts are performed per position at angles of 34°, 37°, 40°, 43°. The angle of emission is greater in zone 2 as a result of the slope of the internal wall of the tubular product in this zone. The number of bursts is greater in zone 4 as there are different typologies of variation of diameters in this zone, even if these variations are of smaller amplitude than in zone 2.

The C-scan 115 shows in FIG. 11b that all the notches are in fact detected, despite the tubular element being divided into only 4 zones. It therefore does not appear necessary to create as many zones defining sets of parameters as there are segments of different typologies along the tubular product. The intensity of return on the defects is homogenous (the intensity is represented by the colour or the greyscale in the C-scan). Thus, the noise level is almost divided in two on notch G in FIG. 11*b* in comparison with the noise level on notch G in FIG. 10*b*. Having at least two parameters or three parameters varying according to the longitudinal position of the sensor, chosen from the gain $G_i(L)$, the emission orientation $\theta e_i$ (L), the temporal filter $FT_i(L)$, makes it possible to improve the quality of the detection of defects in tubular products having a variable cross section.

Furthermore, the test of FIGS. 11*a-c* makes it possible to perform the inspection with 20% fewer bursts than in the case of FIGS. 10*a-c*, while maintaining a good detectability of the defects with a satisfactory signal-to-noise ratio and a good homogeneity of the responses.

It is generally necessary to calibrate non-destructive testing devices in order to set a threshold value for the echo return intensity for a given type of defect and a given type of tubular product. That is to say, there is generally a calibration for the defects of the longitudinal notch type, a calibration for the defects of the transverse notch type, and a calibration for the defects of the flat-bottom hole type, for each type of tubular product. For example, a first type can be a tube having an outside diameter of 250 mm and inside diameter 200 mm, while a second type can be a tube having an outside diameter of 315 mm and inside diameter of 275 mm.

Conventionally, positioning notches (depth and orientation) are used as reference defects, or standard defects, having known dimensions, most frequently standardized, arranged in a sample tube.

In order to limit the number of bursts and limit the computing capacity necessary for the device according to the invention, it is thus preferable to calibrate said device so as to determine the values of parameters chosen from the emission orientation θe(L), the gain G(L) and/or the position of a temporal filter $FT_i(L)$ for different longitudinal positions of the ultrasound sensor or sensors.

Preferably, the choice will be made to position standard defects at different longitudinal positions so as to obtain values for said parameters for each segment typology of the complex tubular product 3 to be inspected, having a variable cross section. In other words, a calibration can be carried out for the different segments of the complex tubular product 3 having a variable cross section. The calibration is performed on a sample tube similar to the complex tubular products to be inspected. Thus, the sample tube has diameter and thickness values similar to a model of tubular product to be inspected, i.e. identical segments, the same complex shapes. The sample tube must moreover be produced from a material identical to that of the model, i.e. the same steel grade, and also have the same heat treatments, the same surface conditions.

The calibration process then makes it possible, based on a sample tube representative of a given tubular product, and for a type of defect, to associate with each position of the ultrasound sensor 5 the parameters that are the emission orientation θe(L), the gain G(L) and/or the position of a temporal filter $FT_i(L)$. These parameters can then be stored in a table such as the one represented below for parameterization as a function of the longitudinal position (L) of the sensor.

| Longitudinal position | Orientation $\theta_j e(L)$ | Gain G(L) | Detection gates FT(L) |
| --- | --- | --- | --- |
| L 1 | θe(L1) | G(L1) | FT(L1) |
| L 2 | θe(L2) | G(L2) | FT(L2) |
| L 3 | θe(L3) | G(L3) | FT(L3) |
| ... | ... | ... | ... |
| L X | θe(LX) | G(LX) | FT(LX) |
| ... | ... | ... | ... |

Reference is now made to FIG. 12.

A complex tubular product 3 having a variable cross section obtained by the industrial processes can have dimensional variations with respect to the desired nominal values. Thus, from the point of view of a sensor, walls of the tubular product to be inspected can have actual slopes of walls or actual positionings of the slopes of the walls that are different from the nominal slopes and positionings. As a result, it is recalled that having a single value for parameters such as the emission orientation $\theta e_i(L)$, the gain $G_i(L)$ and/or the position of a temporal filter $FT_i(L)$ does not always make it possible to have the best response to an ultrasound burst for the detection of a given defect.

Thus, according to an embodiment of the invention, the device comprises a control and processing electronics 6 capable of carrying out a series of ultrasound bursts through channels $V_i$ for a longitudinal position (L) while varying for each channel $V_i$ at least one of the parameters chosen from the emission orientation $\theta_j e(L)$, the gain $G_i(L)$, and/or the position of a temporal filter $FT_i(L)$ close to nominal values of the parameters that are the emission orientation θe(L), the gain G(L) and/or the position of a temporal filter FT(L).

For example, for an inspection of a transverse defect $Dt_{ex}$ at a given longitudinal position $P_{ex}$, the corresponding emission orientation $\theta e(P_{ex})$ may have been determined at 20° in water in the longitudinal plane. Eight ultrasound bursts can be performed with emission orientations θe of 16° to 23° in water by increment of 1°. The control and processing electronics 6 is therefore arranged to perform n burst sequences, for example from 1 to 10 burst sequences.

Each maximum amplitude of a corresponding echo is stored in respective channel memories $MemV_i$, these values are compared by a "Comp channel" channel comparison module that can retain the maximum amplitude from the amplitudes recorded on each of the channels $V_i$. Then, the maximum amplitude recorded is compared by a threshold comparison module linked to a threshold memory. The alert module emits an alert if the maximum amplitude recorded on the different channels exceeds the threshold indicated for this type of defect.

In the memory MEMp, the emission orientation $\theta_j e(L)$ can advantageously be defined by a pair of angles that can be the longitudinal component and the transverse component of the angle of emission $(\theta_N e(L); \theta_s e(L))_i$ which respectively represent the angle between the normal to the ultrasonic sensor and the projection of the burst in a longitudinal plane, i.e. a plane containing the axis of the tubular product, and the angle of burst between the normal to the ultrasound sensor and the projection of the burst in a transverse plane, i.e. a plane containing a cross section of the tubular product.

For example, within the framework of the inspection in FIG. 9, the transverse component of the angle $\theta_s e(L)$ is equal to the mechanical angle θm of the sensor and is fixed throughout the inspection, at a value typically chosen at 17°, while the longitudinal component of the angle $\theta_N e(L)$ is variable according to the longitudinal position (L) with values comprised between −6° and 6°. For an inspection of defects of the longitudinal notch or flat-bottom holes types, the mechanical angle θm of the sensor is typically chosen at 0°.

In practice, this decomposition is adapted to the type of sensor used. For a multi-element linear transducer, the angle can only be modified in a single plane. A first angle of the two angles, longitudinal and transverse, is therefore mechanical, and the second of these two angles is electronically driven. For a multi-element matrix transducer, it is possible to drive these two angles electronically.

The gain $G_i(L)$ is a gain to be applied to the position (L). Most frequently, the gain is substantially identical for all the channels. It may be advantageous to vary the gain and thus to define several gains per channel $G_i(L)$ for each channel, in particular in order to improve the detectability of defects of the delamination type. This also makes it possible to improve the homogeneity of response on oblique defects and with bursts having different emission orientations.

In a preferred embodiment, the gain G(L) is applied to the signal corresponding to the emission of the ultrasound wave.

In another embodiment, the gain G(L) is applied to the signal corresponding to the reception of the ultrasound burst echo. The reception gain G(L) is then denoted Gr(L). It is more advantageous to modify the reception gain Gr(L) than the emission gain Ge(L), as the latter gain can have the disadvantage of amplifying the noise received and can thus be the source of false positives.

In a variant embodiment, the device comprises an emission gain chosen as a function of the channel $V_i$ and denoted $Ge_i(L)$.

In another variant embodiment, the device comprises a reception gain chosen as a function of the channel $V_i$ and denoted $Gr_i(L)$.

In the memory MEMp, the data representative of a detection gate FT(L) can be a data couplet indicating the start of the temporal detection gate and the end of the temporal detection gate.

The memory MEMp can also be equipped with data representative of detection gates for each channel $V_i$, denoted $FT_i(L)$, in the form of several series of values. In fact, for a longitudinal position L, there may be i bursts having different orientations, and the position of the detection gates may need to be adapted from different detection gates. Furthermore, the variation in the positioning of the detection gates makes it possible to compensate for the dimensional divergences in wall thicknesses of the tubular product. In the case of a tube thicker than the nominal value, the actual time-of-flight of an ultrasound wave is longer. It may therefore be advantageous to provide for a second detection gate positioned successively in time to a first detection gate.

In addition, according to an embodiment, it is possible to have two groups of channels $V_i$ having corresponding values on the emission angles and gains applied, the two groups being differentiated mainly by the position of the detection gates $FT_i(L)$ in order to allow the possible detection of internal defects with the first group of channels $V_i$, and the detection of external defects with the second group of channels $V_i$.

| Longitudinal position L1 ... LX | Orientation $\theta_i e(L)$ i = 1 ... n | Emission gain $Ge_i(L)$ i = 1 ... n | Reception gain $Gr_i(L)$ i = 1 ... n | Detection gates $FT_i(L)$ i = 1 ... n |
|---|---|---|---|---|
| L 1 | $\theta_1 e(L1) = (\theta_N e(L1); \theta_S e(L1))_1$ | $Ge_1(L1)$ | $Gr_1(L1)$ | $FT_1(L1) = FT_{START1}(L1)$ $FT_{STOP1}(L1)$ |
|  | $\theta_i e(L1) = (\theta_N e(L1); \theta_S e(L1))_i$ | $Ge_i(L1)$ | $Gr_i(L1)$ | $FT_i(L1) = FT_{STARTi}(L1)$ $FT_{STOPi}(L1)$ |
|  | $\theta_n e(L1) = (\theta_N e(L1); \theta_S e(L1))_n$ | $Ge_n(L1)$ | $Gr_n(L1)$ | $FT_n(L1) = FT_{STARTn}(L1)$ $FT_{STOPn}(L1)$ |
| L 2 | $\theta_1 e(L2) = (\theta_N e(L2); \theta_S e(L2))_1$ | $Ge_1(L2)$ | $Gr_1(L2)$ | $FT_1(L2) = FT_{START1}(L2)$ $FT_{STOP1}(L2)$ |
|  | $\theta_i e(L2) = (\theta_N e(L2); \theta_S e(L2))_i$ | $Ge_i(L2)$ | $Gr_i(L2)$ | $FT_i(L1) = FT_{STARTi}(L2)$ $FT_{STOPi}(L2)$ |
|  | $\theta_n e(L2) = (\theta_N e(L2); \theta_S e(L2))_n$ | $Ge_n(L2)$ | $Gr_n(L2)$ | $FT_n(L1) = FT_{STARTn}(L2)$ $FT_{STOPn}(L2)$ |
| ... | ... | ... | ... | ... |
| L X | $\theta_1 e(LX) = (\theta_N e(LX); \theta_S e(LX))_1$ | $Ge_1(LX)$ | $Gr_1(LX)$ | $FT_1(LX) = FT_{START1}(LX)$ $FT_{STOP1}(LX)$ |
|  | $\theta_i e(LX) = (\theta_N e(LX); \theta_S e(LX))_i$ | $Ge_i(LX)$ | $Gr_i(LX)$ | $FT_i(LX) = FT_{STARTi}(LX)$ $FT_{STOPi}(LX)$ |
|  | $\theta_n e(LX) = (\theta_N e(LX); \theta_S e(L1))_n$ | $Ge_n(LX)$ | $Gr_n(LX)$ | $FT_n(LX) = FT_{STARTn}(LX)$ $FT_{STOPn}(LX)$ |

In an embodiment of a test bench according to the invention suitable for inspecting a tubular product with a profile having only intentional variations in thickness on the circumference thereof, and therefore without intentional variation in the cross section thereof in the length of said tubular product, or in other words with a substantially invariable thickness along a generatrix of the tubular product, the memory MEMp can be organised similarly to that of the preceding embodiment by replacing the variable L with the variable A.

In another embodiment of a test bench according to the invention suitable for inspecting a tubular product having intentional variations in thickness both along the tubular product and on the circumference of the tubular product, the memory MEMp can be organised in a similar manner to that of the preceding detailed embodiment, replacing the variable L with the couplet of variables (L; A).

The invention also relates to a non-destructive testing method for the detection of defects in tubular products having a complex shape comprising the steps of:

positioning an ultrasound transducer 5 with respect to a complex tubular product 3 at a first position P1 with respect to the complex tubular product 3;

for this first position P1, performing at least one ultrasound burst with an ultrasound beam having at least one first emission orientation $\theta_j e(L; A)$, a first emission gain $Ge_i(P1)$, and receiving an echo signal and applying to this echo signal at least one first reception gain $Gr_i(P1)$ and a first temporal filter $FT_i(P1)$ positioning the ultrasound transducer at a second position P2 with respect to the complex tubular product 3;

for this second position P2, performing at least one second ultrasound burst with a second emission orientation $\theta_j e(P2)$, a second reception gain $Gr_i(P2)$, or a second emission gain $Ge_i(P2)$, a second temporal filter $FT_i(P2)$;

the at least one from the second emission orientation $\theta_j e(P2)$, the second reception gain $Gr_i(P2)$, the second emission gain $Ge_i(P2)$, the second temporal filter $FT_i(P2)$ being respectively different from the first emission orientation $\theta_j e(P1)$, the first reception gain $Gr_i(P1)$, or the first emission gain $Ge_i(P1)$ the first temporal filter $FT_i(P1)$.

In an embodiment of this method, the position P1 is a first longitudinal position L1 of the ultrasound sensor 5 and the position P2 is a second longitudinal position L2 of the ultrasound sensor 5.

This method can be applied to a set of contiguous longitudinal positions L forming an inspection segment. It is then possible to form a first inspection segment 1n which the ultrasound bursts $V_i$ will have the same parameters of the bursts forming a first set of burst parameters, and it is possible to form another inspection segment 1n which the ultrasound bursts will have another set of burst parameters, being differentiated from the first set of burst parameters by at least one of the parameters from the emission orientation $\theta_j e(L)$, the reception gain $Gr_i(L)$, the emission gain $Ge_i(L)$, the temporal filter $FT_i(L)$.

It will be understood that for a longitudinal position L, ultrasound bursts can be performed along substantially the entire circumference of the tubular product, for example over 360° with a burst distributed regularly by angular increment comprised between 1° et 15°, performing bursts at locations of the ultrasound transducer 5 determined by a longitudinal position L and a circumferential position A.

In a second embodiment of this method, the position P1 is a first circumferential position A1 of the ultrasound sensor 5 and the position P2 is a second circumferential position A2 of the ultrasound sensor 5.

In a third embodiment of this method, the position P1 is a first longitudinal L1 and circumferential A1 position of the ultrasound sensor 5 and the position P2 is a second longitudinal L2 and circumferential A2 position of the ultrasound sensor 5.

It will be understood that it is possible to perform, for a position of the ultrasound transducer 5 at a given longitudinal L and circumferential A position, a series of ultrasound bursts by varying between each burst at least one parameter from the emission orientation $\theta_j e(L; A)$, the reception gain $Gr_i(L; A)$, the emission gain $Ge_i(L; A)$, the temporal filter $FT_i(L; A)$. Preferably, the emission orientation $\theta_j e(L)$ is varied between a minimum value $\theta_{min} e(L; A)$ and a maximum value $\theta_{max} e(L; A)$. This makes it possible to improve the defect detection despite unintentional geometric imperfections (ovality, excentration) of the tubular product.

The invention claimed is:

1. An automated device for non-destructive testing for the detection of defects of a complex tubular product, comprising:
   at least one ultrasound transducer having a position defined by a longitudinal position and a circumferential position along the complex tubular product and arranged to emit an ultrasound beam having a burst emission orientation;
   control and processing electronics comprising:
      a circuit for activating the at least one ultrasound transducer and receiving return signals,
      at least one amplification stage with a gain, and
      a temporal filter module configured to apply a temporal filter to an echo signal,
   wherein the control and processing electronics is configured to, when testing for a defect having a first defect orientation, modify the burst emission orientation of the ultrasound beam as a function of the longitudinal and/or circumferential position of the ultrasound transducer so as to detect the defect having the first defect orientation in a tube wall of the complex tubular product.

2. The device according to claim 1, wherein the control and processing electronics is configured to modify at least one of the gain and the position of the temporal filter as a function of the circumferential position of the at least one ultrasound transducer so as to detect the defect having the first defect orientation in the tube wall.

3. The device according to claim 1, wherein the control and processing electronics is configured to modify at least one of the gain and the position of the temporal filter as a function of the longitudinal position of the at least one ultrasound transducer so as to detect the defect having the first defect orientation in the tube wall.

4. The device according to claim 3, wherein the control and processing electronics is configured to modify the burst emission orientation, the gain and the position of the temporal filter module as a function of the longitudinal position of the at least one ultrasound transducer.

5. The device according to claim 3, wherein the control and processing electronics is configured to also modify at least one parameter chosen from the burst emission orientation, the gain and the position of the temporal filter module as a function of the circumferential position of the at least one ultrasound transducer.

6. The device according to claim 1, comprising at least one position sensor for determining the longitudinal position of the at least one ultrasound transducer relatively with respect to the complex tubular product.

7. The device according to claim 1, comprising at least one position sensor for determining the longitudinal position and the circumferential position of the at least one ultrasound transducer relatively with respect to the complex tubular product.

8. The device according to claim 6, wherein the at least one position sensor is chosen from an incremental encoder, a rack encoder, a linear encoder, a draw-wire encoder, a laser velocimeter, an encoder wheel or an incremental encoder wheel.

9. The device according to claim 1, comprising at least one timer for determining a relative longitudinal and circumferential position of the ultrasound transducer.

10. The device according to claim 1, wherein the at least one amplification stage is an emission amplification stage having an emission gain and the control and processing electronics is configured to vary said emission gain as a function of the longitudinal position of the ultrasound transducer.

11. The device according to claim 1, wherein the at least one amplification stage is a reception amplification stage having a reception gain and the control and processing electronics is configured to vary said reception gain as a function of the longitudinal position of the ultrasound transducer.

12. The device according to claim 1, comprising an emission amplification stage having an emission gain and a reception amplification stage having a reception gain and wherein the control and processing electronics is configured to vary the emission gain or the reception gain as a function of the longitudinal position of the ultrasound transducer.

13. The device according to claim 1, wherein the control and processing electronics comprises a parametric memory module configured to store data in the form of association between at least one longitudinal position of at least one ultrasound transducer and at least one data set corresponding to emission orientation parameters of the burst, gain and/or position of the temporal filter.

14. The device according to claim 1, wherein the control and processing electronics comprises a parametric memory module configured to store data in the form of association between at least one circumferential position of at least one ultrasound transducer and at least one data set corresponding to emission orientation parameters of the burst, gain and/or position of the temporal filter.

15. The device according to claim 1, wherein the control and processing electronics comprises a parametric memory module is configured to store data in the form of association between longitudinal and circumferential position couplets of the ultrasound transducer and at least one data set corresponding to emission orientation parameters of the burst, gain and position of the temporal filter.

16. The device according to claim 13, wherein the parametric memory module comprises at least one data set corresponding to gain parameters in the form of reception gain and emission gain parameters.

17. The device according to claim 1, wherein the control and processing electronics is configured to emit several ultrasound bursts for one position of the ultrasound transducer, the ultrasound bursts having angles of emission comprised between a minimum orientation angle of position and a maximum orientation angle of position.

18. The device according to claim 17, wherein the control and processing electronics is arranged to carry out from 2 to 8 ultrasound bursts for one position of the at least one ultrasound transducer.

19. The device according to claim 1, wherein at least one ultrasound transducer is a rod-type ultrasound transducer.

20. The device according to claim 1, wherein the at least one ultrasound transducer is a phased array sensor.

21. An automated method for testing complex tubular products having varying outside or inside diameters, the method comprising:
   a. positioning at least one ultrasound transducer in a first position;
   b. carrying out a first ultrasound burst by emitting an ultrasound beam having a first orientation, and a first emission amplification with a first emission gain to test for a defect having a first defect orientation;
   c. receiving an echo returned by the complex tubular product and the received echo is converted into a received signal to which a first reception gain is applied;
   d. isolating a portion of the signal in a first temporal window;
   e. performing a second ultrasound burst by repeating steps a to d at a second position to test for the defect having a first direction orientation with second ultrasound burst parameters comprising a second orientation, a second emission gain, a second reception gain, a second temporal window, and wherein
   at least one of the second ultrasound burst parameters from the second orientation, the second emission gain, the second reception gain, the second temporal window is different from the first orientation, the first emission gain, the first reception gain or the first temporal window, and
   the first position is different from the second position in at least one of a longitudinal direction and a circumferential position of the complex tubular product.

* * * * *

UNITED STATES PATENT AND TRADEMARK OFFICE
CERTIFICATE OF CORRECTION

| | |
|---|---|
| PATENT NO. | : 11,519,880 B2 |
| APPLICATION NO. | : 16/625298 |
| DATED | : December 6, 2022 |
| INVENTOR(S) | : Olivier Lazzari |

It is certified that error appears in the above-identified patent and that said Letters Patent is hereby corrected as shown below:

In the Specification

In Column 3, Line 52, delete "100." and insert -- 10°. --, therefor.

In Column 11, Line 40, delete "Or," and insert -- θr, --, therefor.

In Column 11, Line 41, delete "400." and insert -- 40°. --, therefor.

In Column 11, Line 42, delete "Or" and insert -- θr --, therefor.

In Column 12, Line 4, delete "1n" and insert -- in --, therefor.

In Column 12, Line 6, delete "1n" and insert -- in --, therefor.

In Column 12, Line 20, delete "Or" and insert -- θr --, therefor.

In Column 12, Line 24, delete "400" and insert -- 40° --, therefor.

In Column 20, Line 2, delete "1n" and insert -- in --, therefor.

In Column 20, Line 45, delete "00" and insert -- 0° --, therefor.

In Column 22, Line 5, delete "370" and insert -- 37° --, therefor.

In Column 22, Line 6, delete "430" and insert -- 43° --, therefor.

In Column 27, Line 52, delete "1n" and insert -- in --, therefor.

In Column 27, Line 55, delete "1n" and insert -- in --, therefor.

Signed and Sealed this
Twenty-eighth Day of May, 2024

*Katherine Kelly Vidal*

Katherine Kelly Vidal
*Director of the United States Patent and Trademark Office*